(12) United States Patent
Samsoondar

(10) Patent No.: US 9,162,186 B2
(45) Date of Patent: Oct. 20, 2015

(54) SAMPLE FILTRATION ASSEMBLY

(75) Inventor: James Samsoondar, Markham (CA)

(73) Assignee: CHROMEDX CORP., Toronto, Ontario (CA)

( * ) Notice: Subject to any disclaimer, the term of this patent is extended or adjusted under 35 U.S.C. 154(b) by 690 days.

(21) Appl. No.: 13/549,443

(22) Filed: Jul. 14, 2012

(65) Prior Publication Data

US 2013/0026085 A1     Jan. 31, 2013

Related U.S. Application Data

(60) Provisional application No. 61/510,506, filed on Jul. 22, 2011.

(51) Int. Cl.
*B01D 63/02*      (2006.01)

(52) U.S. Cl.
CPC ............ *B01D 63/02* (2013.01); *B01D 2313/16* (2013.01); *B01D 2313/18* (2013.01); *B01D 2313/24* (2013.01)

(58) Field of Classification Search
None
See application file for complete search history.

(56) References Cited

U.S. PATENT DOCUMENTS

| | | | | |
|---|---|---|---|---|
| 5,674,394 A | * | 10/1997 | Whitmore | 210/321.8 |
| 6,010,627 A | * | 1/2000 | Hood, III | 210/321.6 |
| 7,807,450 B2 | | 10/2010 | Samsoondar | |
| 7,816,124 B2 | | 10/2010 | Samsoondar | |
| 8,101,404 B2 | | 1/2012 | Samsoondar | |
| 8,696,905 B2 | * | 4/2014 | Coull et al. | 210/321.79 |

\* cited by examiner

*Primary Examiner* — Terry Cecil

(57) ABSTRACT

The present invention provides a filtration assembly in the form of a disposable cartridge. A key feature of the invention is a filtration chamber having a porous membrane also referred to as a filter, a sample inlet to the filtration chamber, and an outlet for outflow of the fraction of sample that does not penetrate the membrane. The membrane can be used in any configuration, for example a hollow fiber. The fraction of sample that penetrates the membrane is referred to as the filtrate, and the fraction that does not penetrate the membrane is referred to as the retentate or concentrate. Some uses of the cartridge are to prepare plasma from blood, and to prepare a plasma ultra-filtrate from plasma, without the need for centrifugation. Many therapeutic drugs are highly protein bound, and a plasma ultra-filtrate is sometimes required to measure the unbound biologically active drugs.

10 Claims, 17 Drawing Sheets

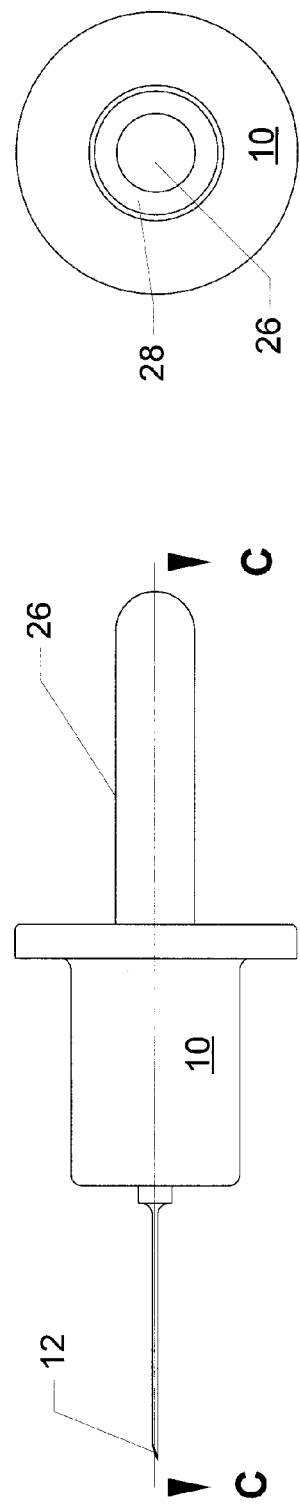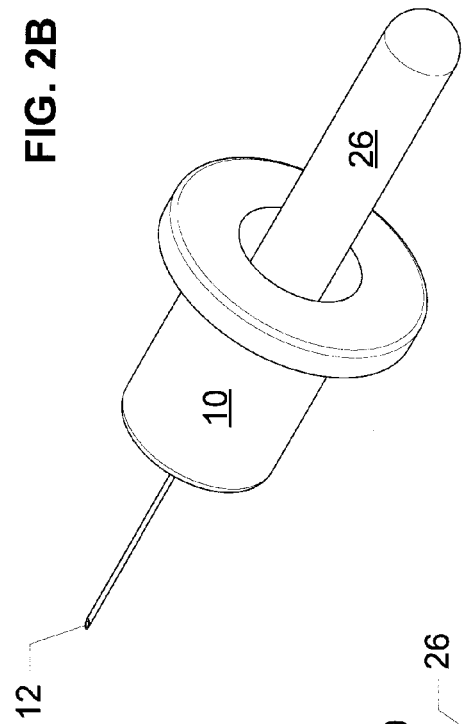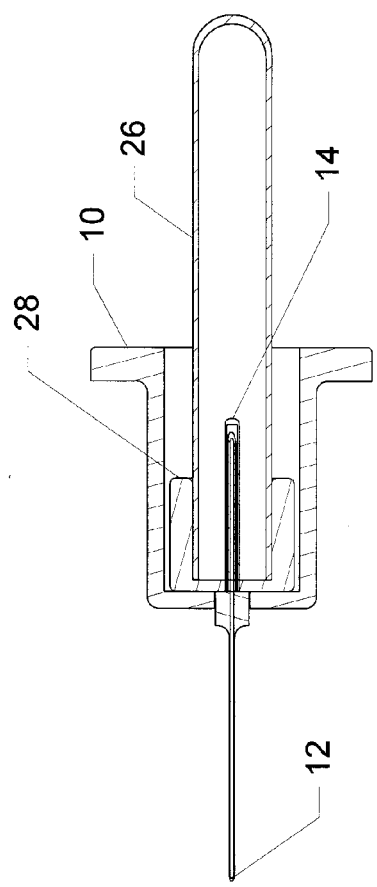

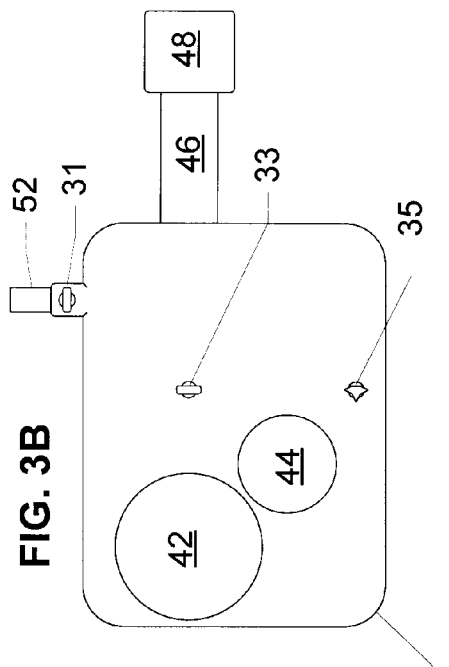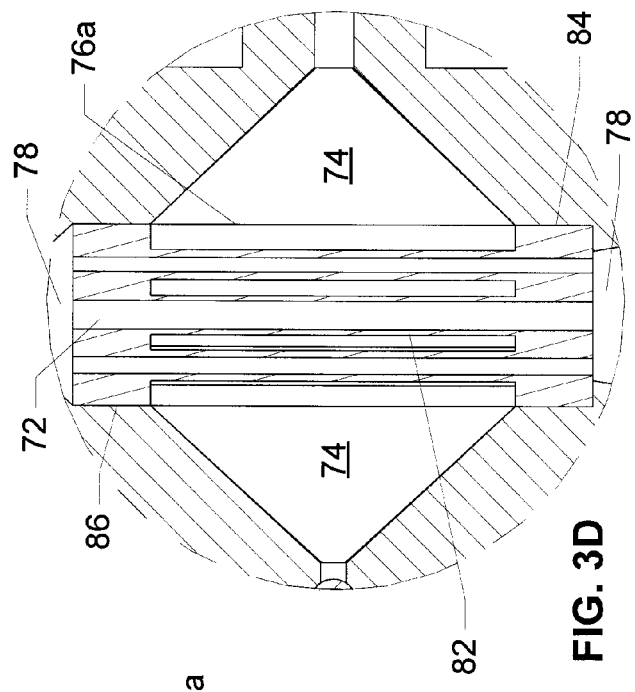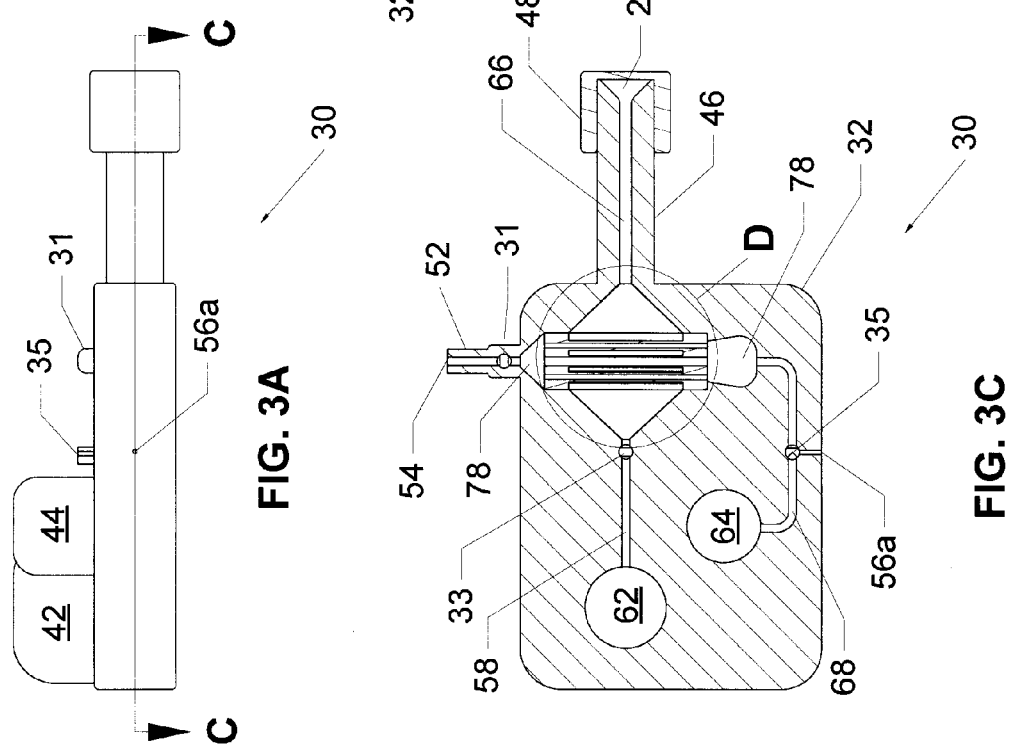

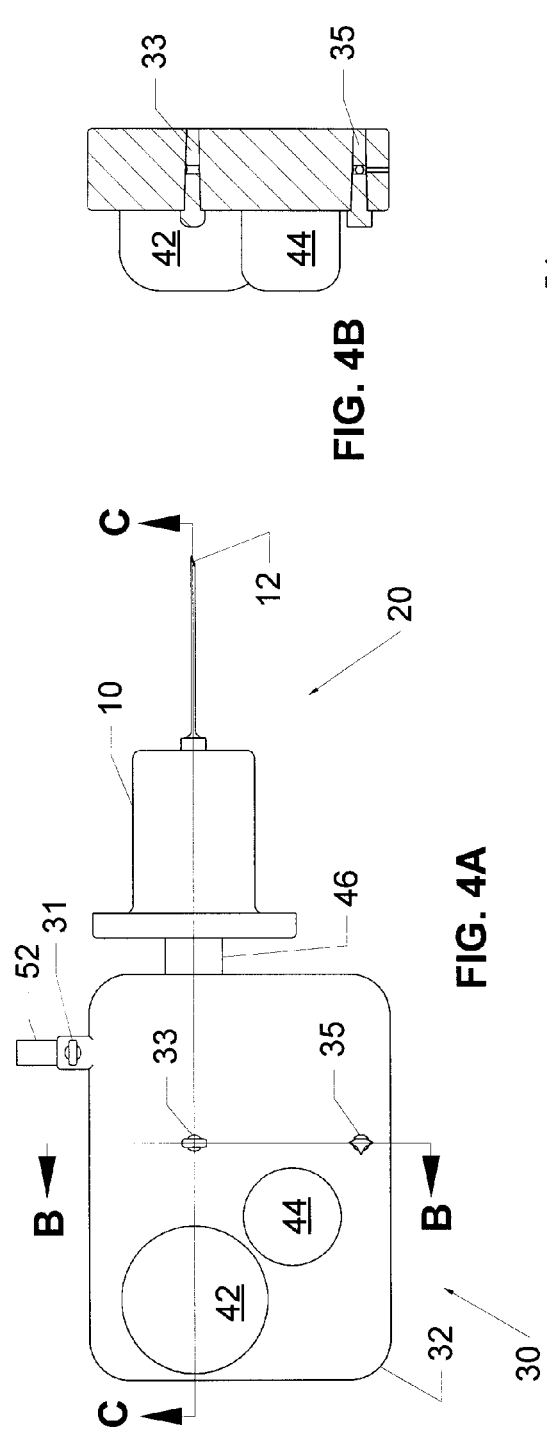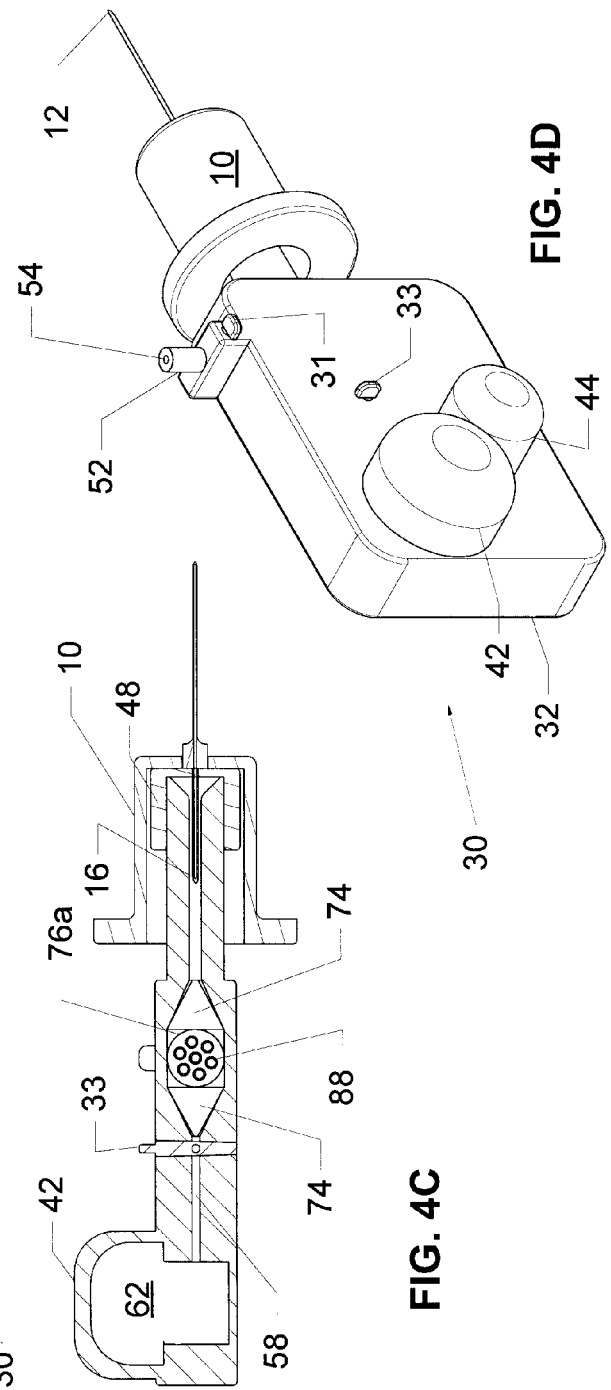

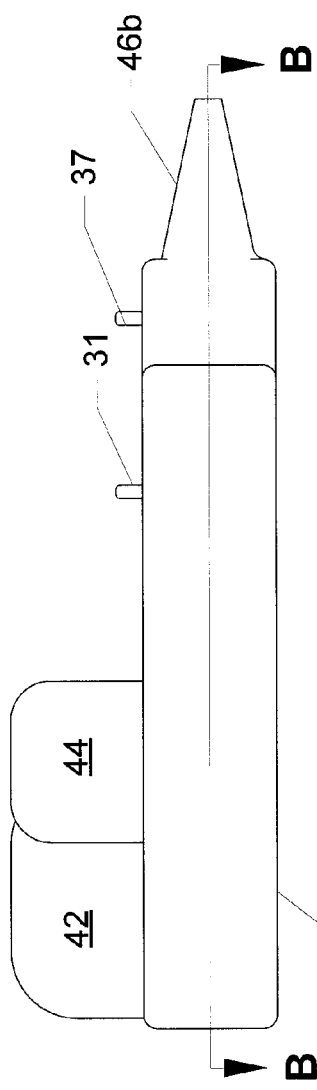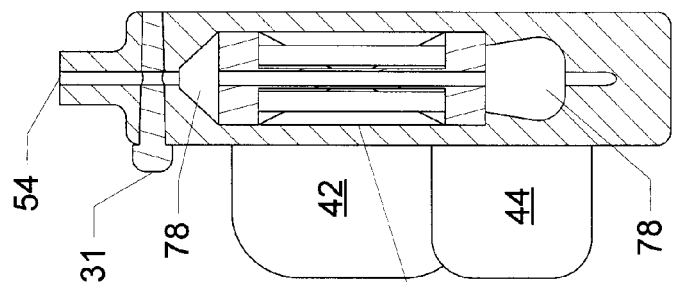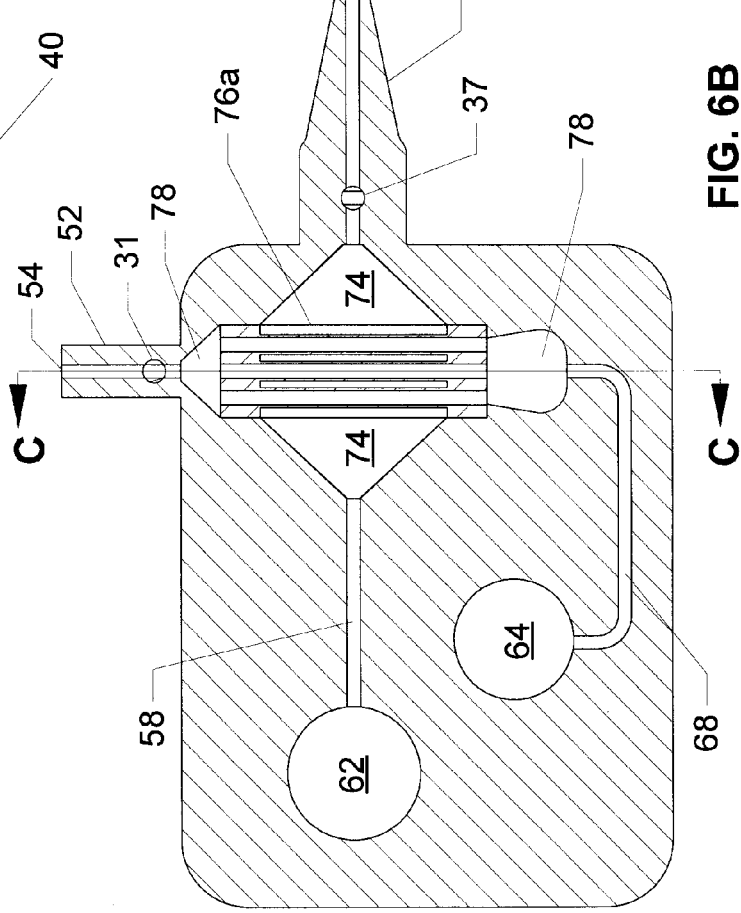

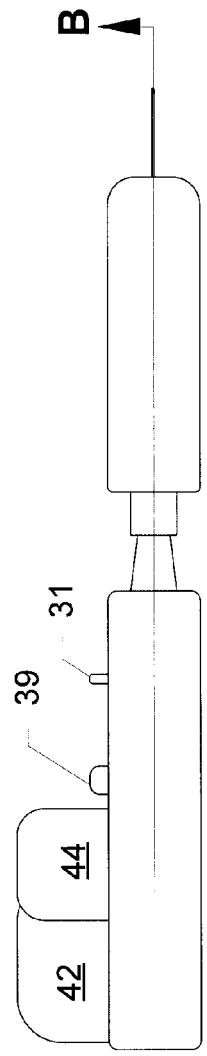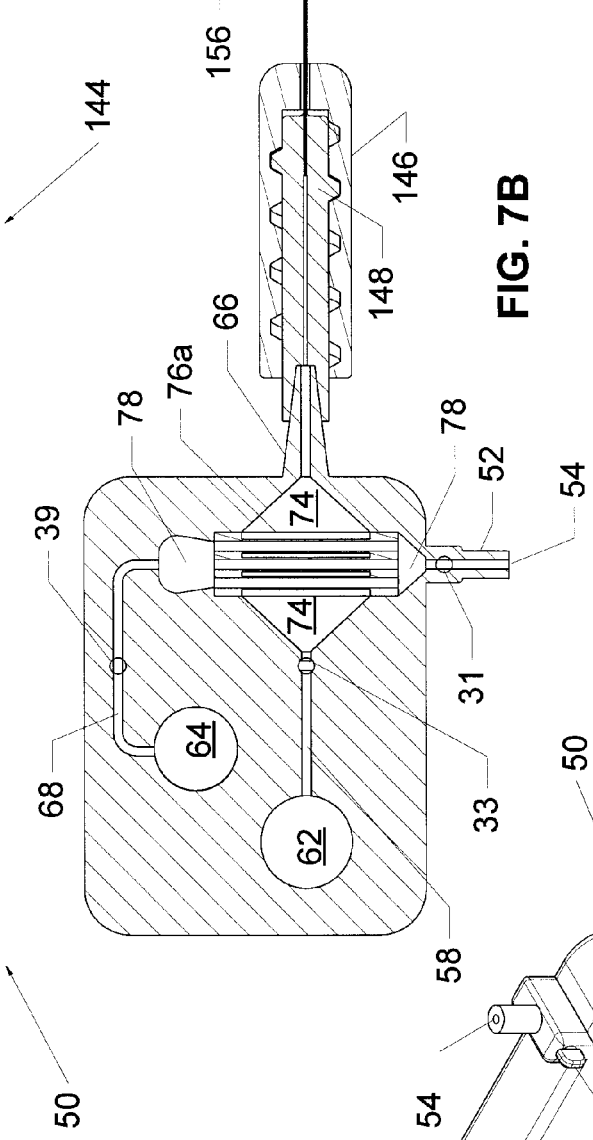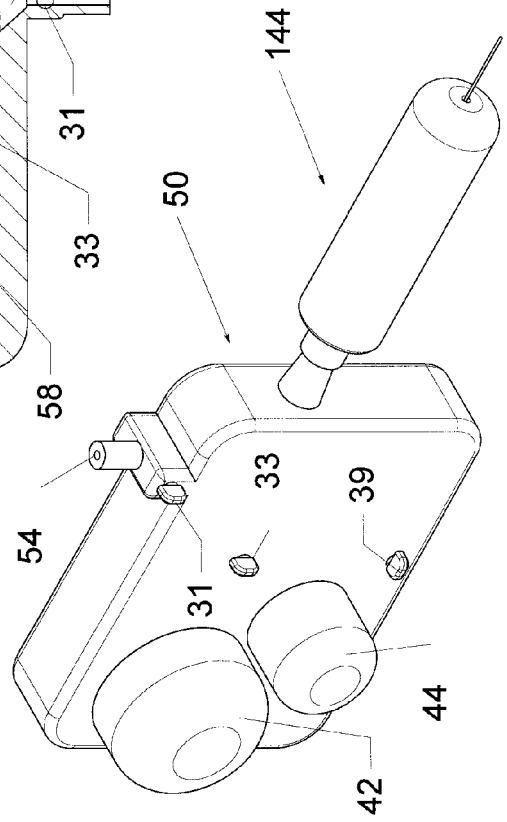
FIG. 7A
FIG. 7B
FIG. 7C

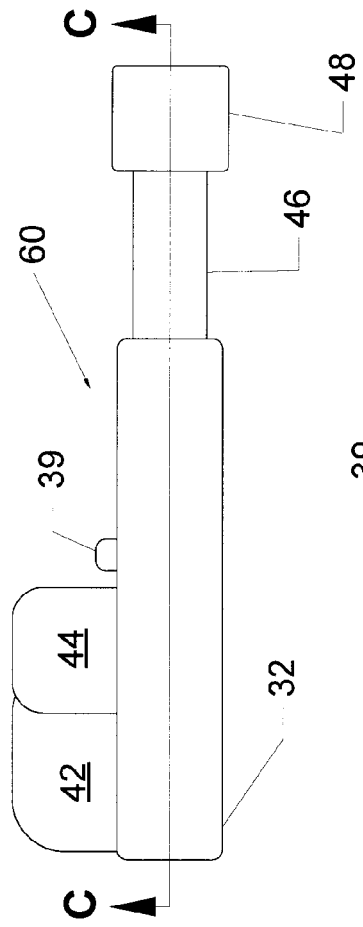
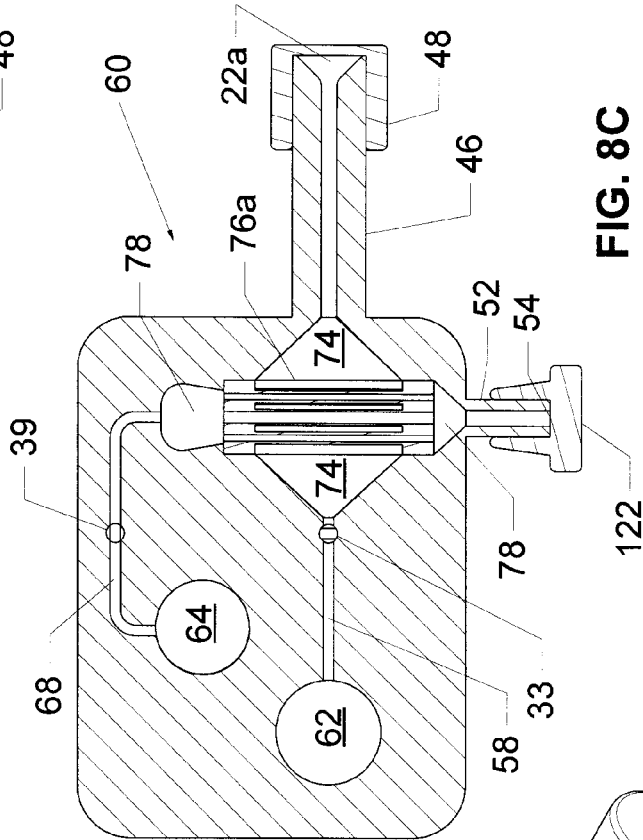
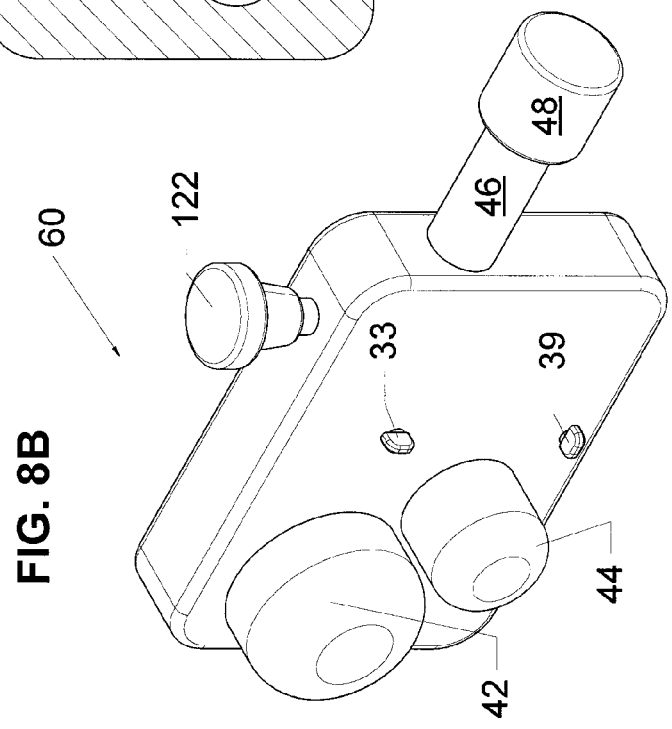
FIG. 8A
FIG. 8B
FIG. 8C

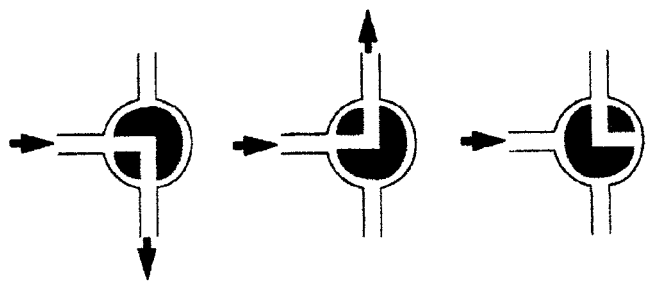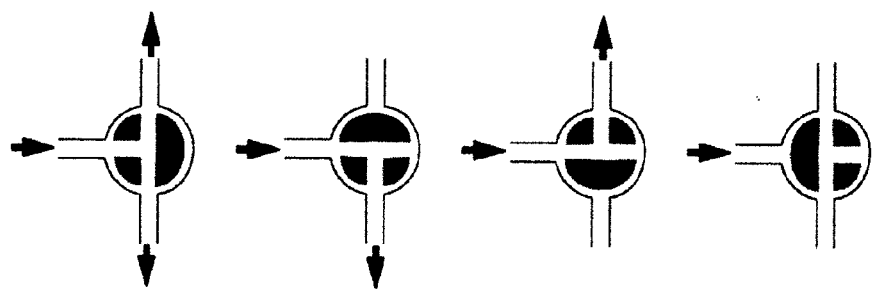
FIG. 9

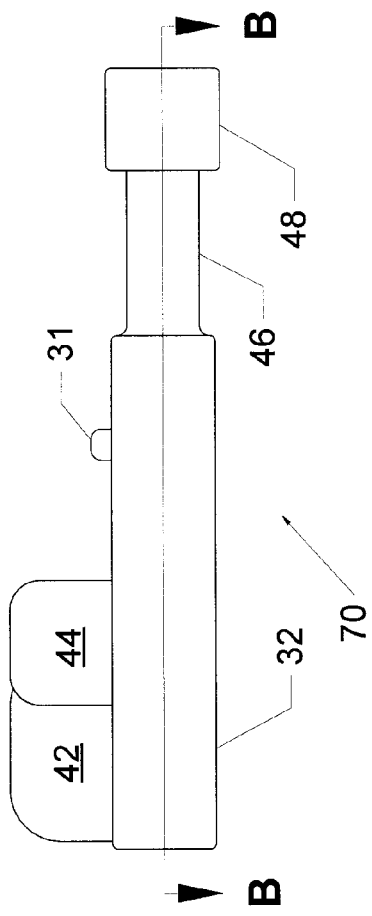
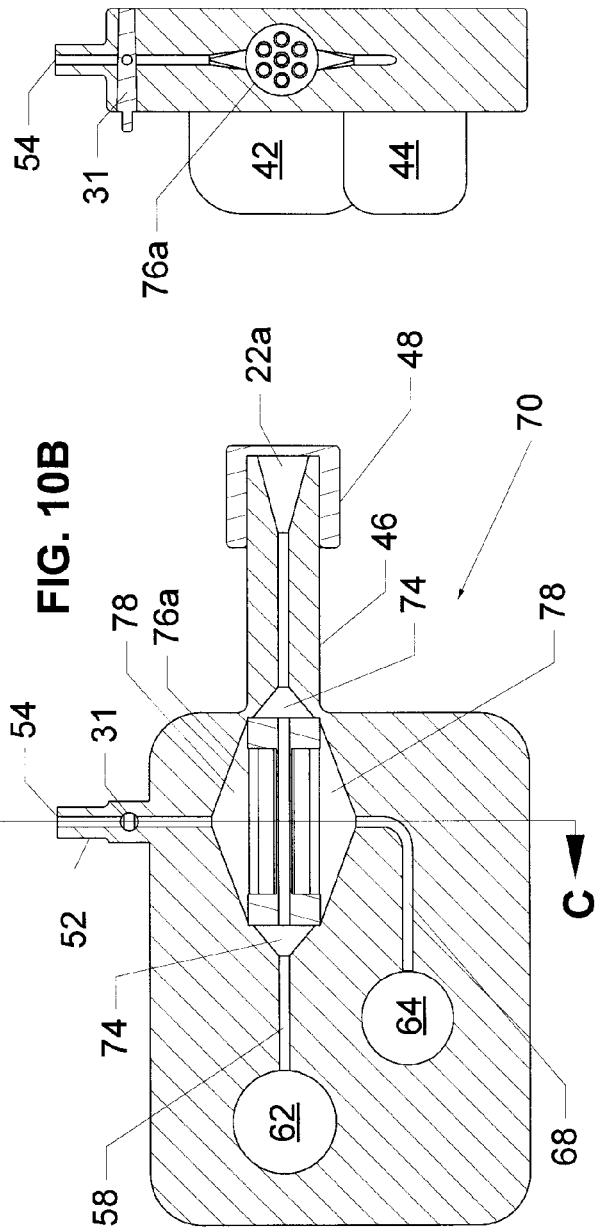
FIG. 10A
FIG. 10B
FIG. 10C

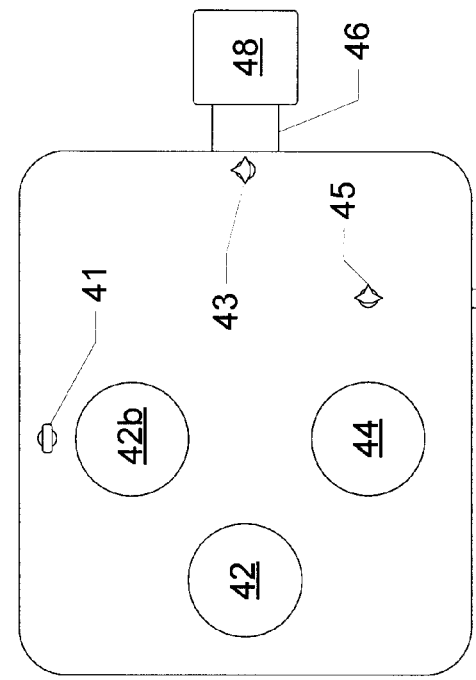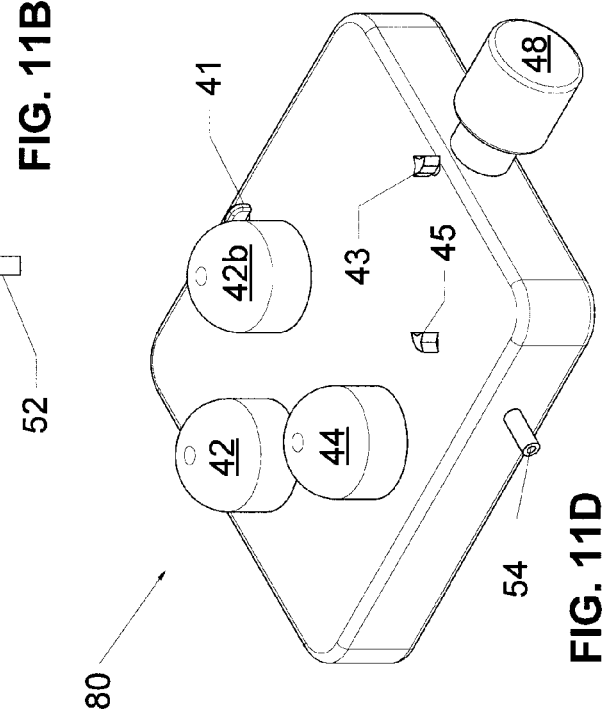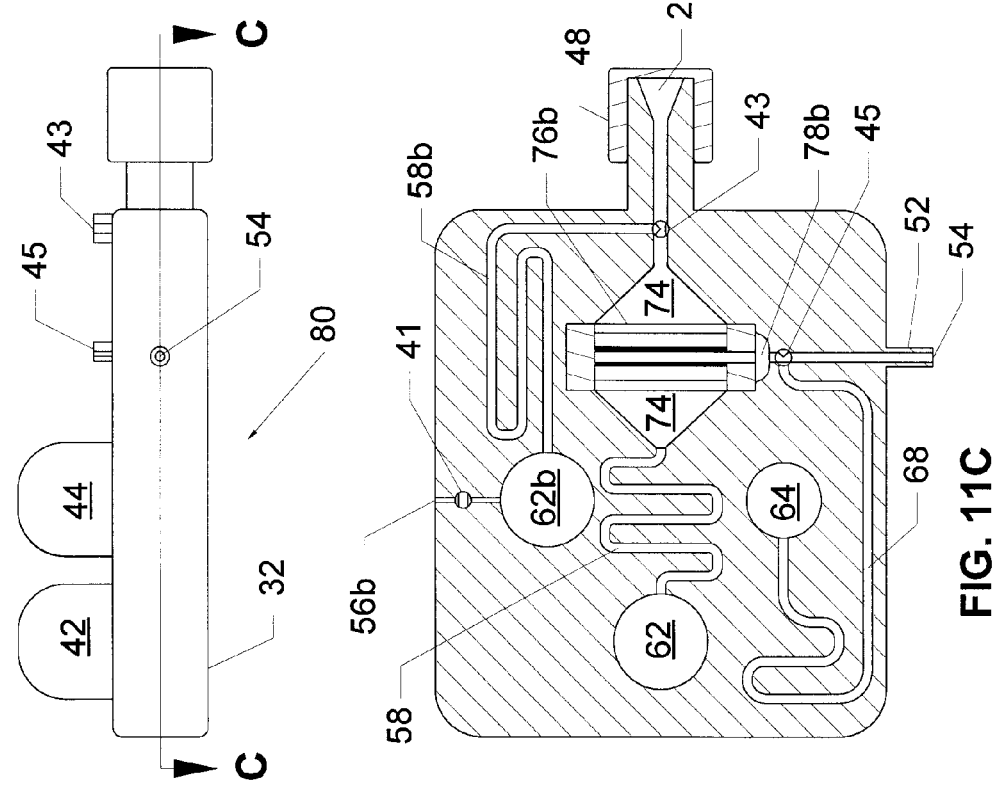

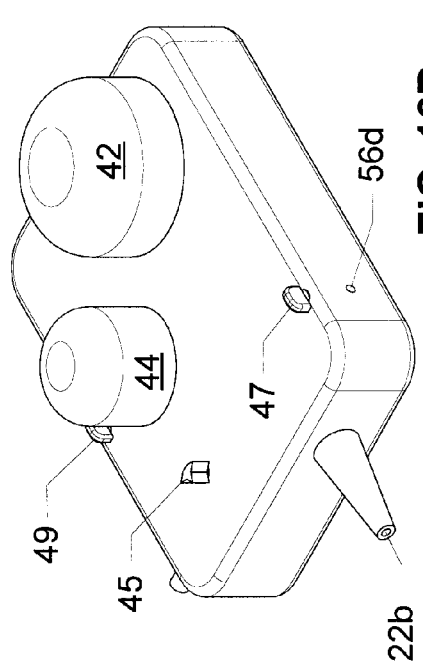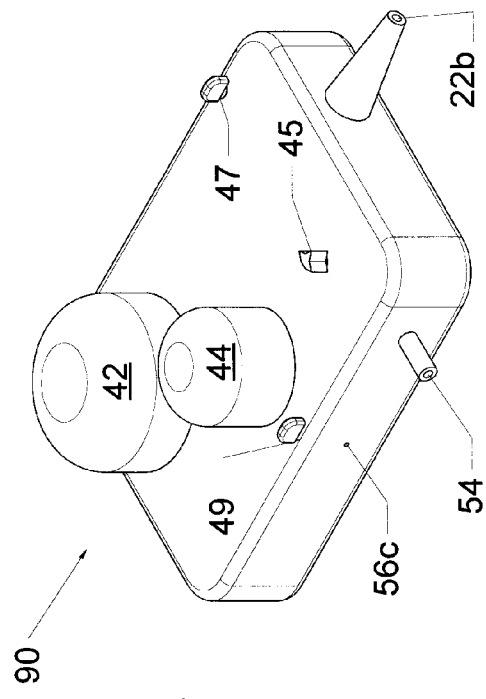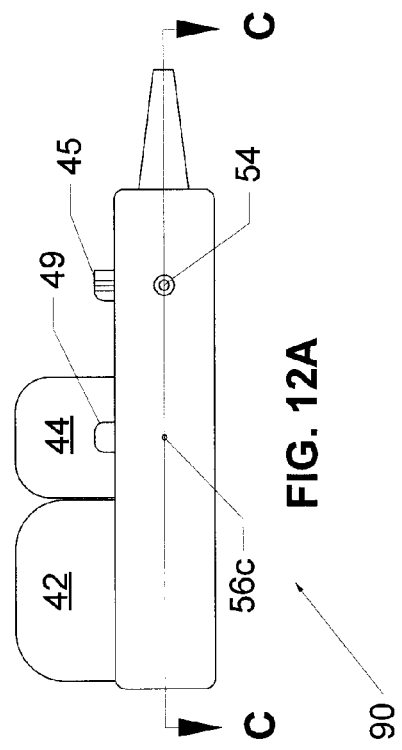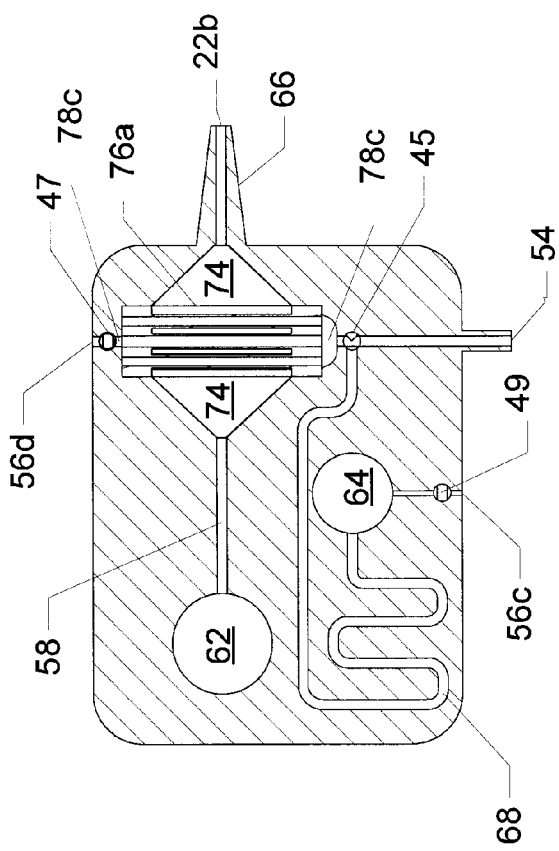

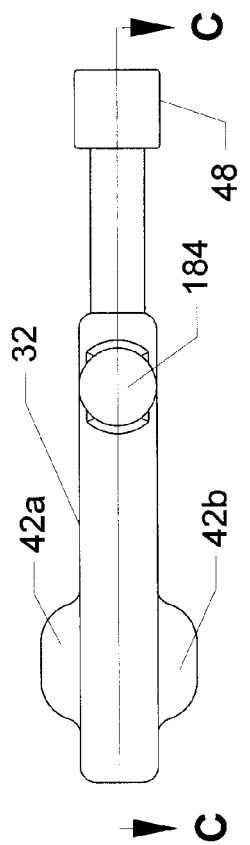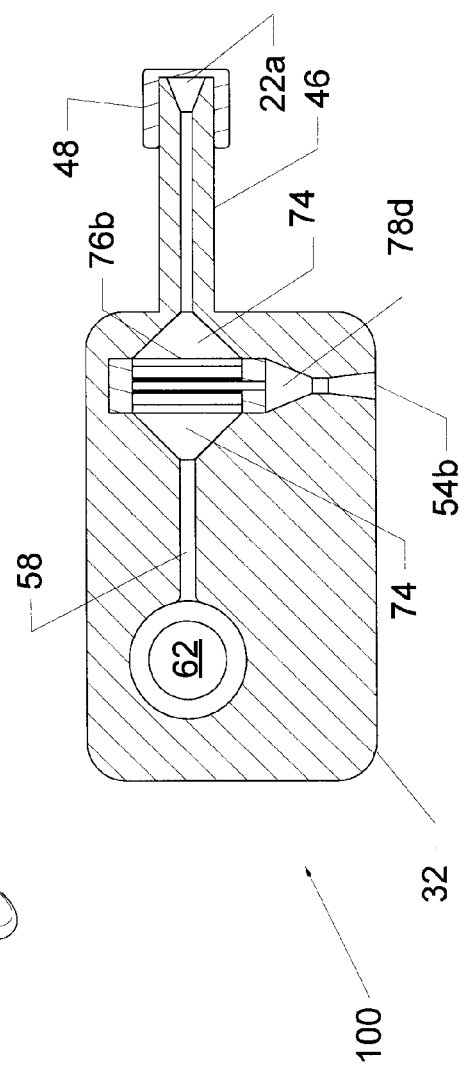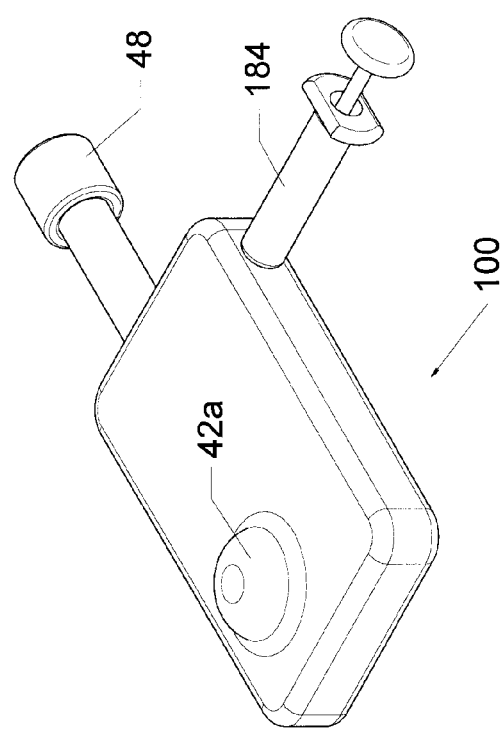

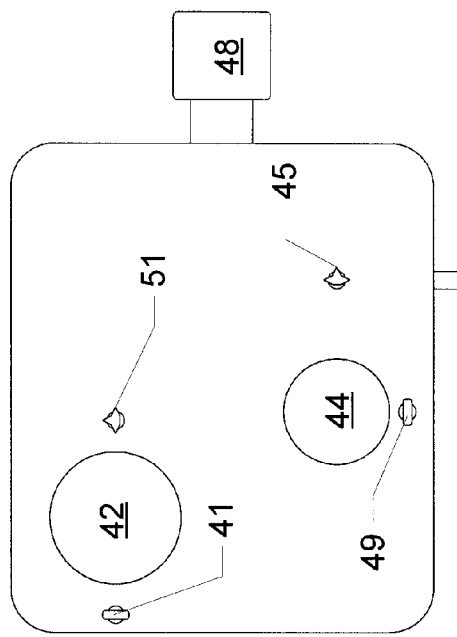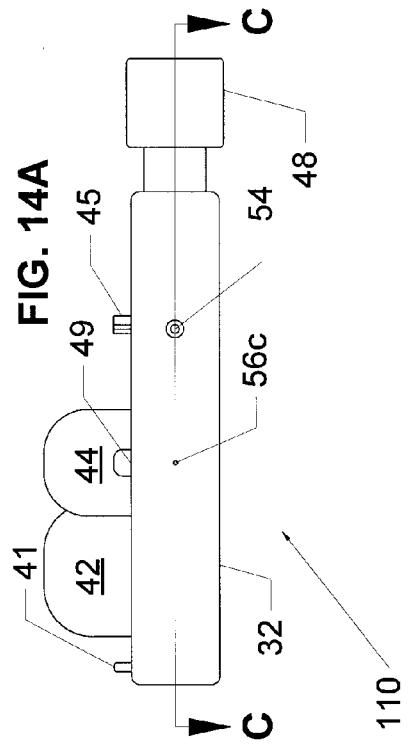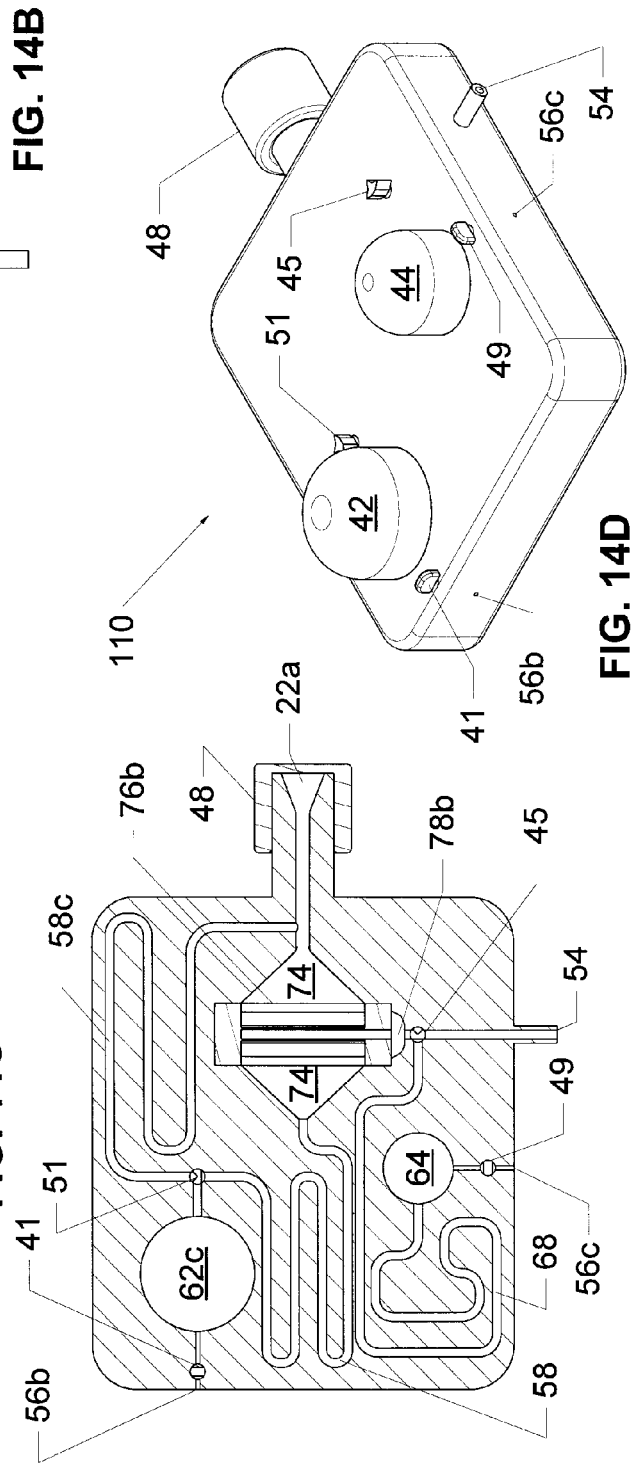

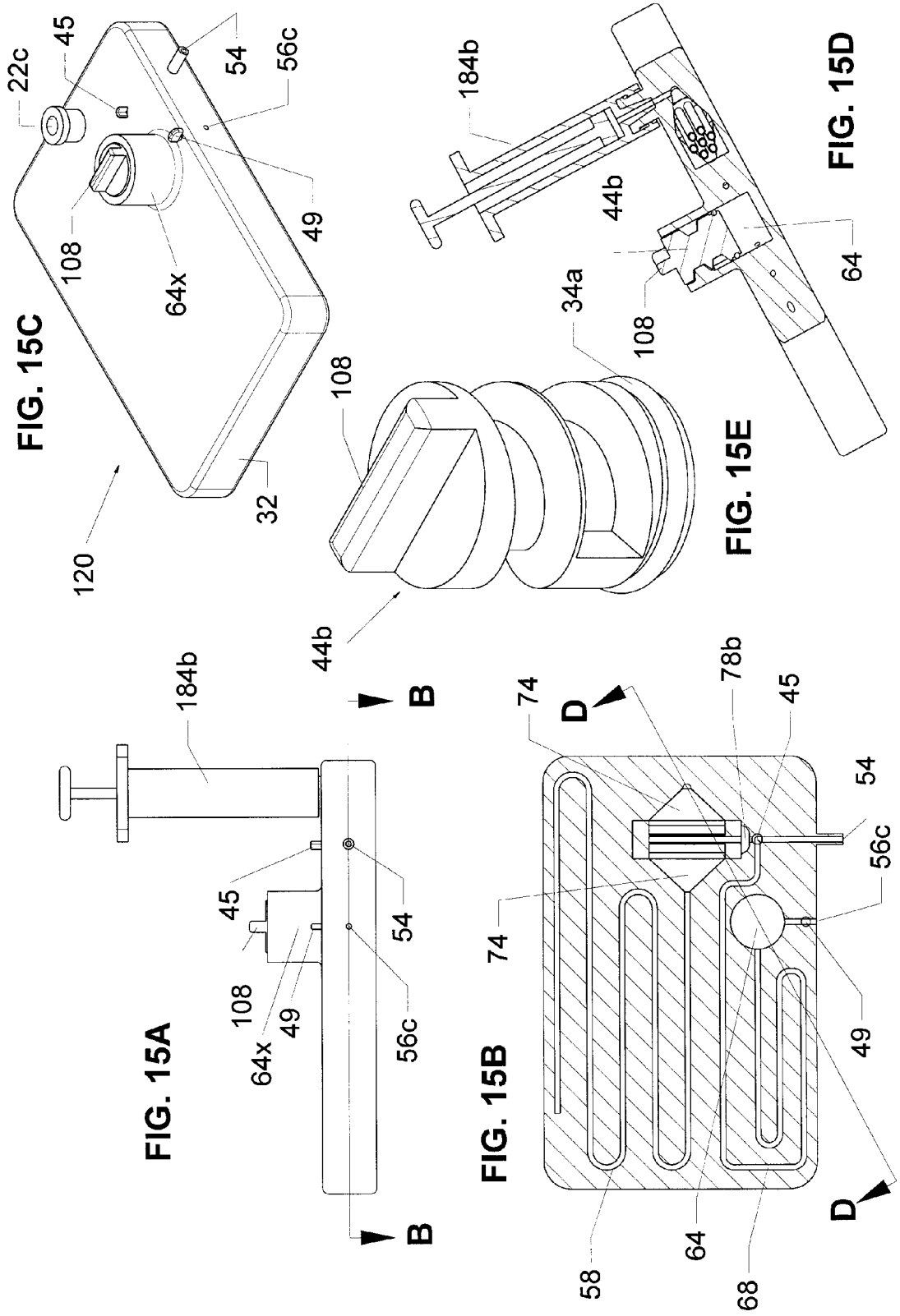

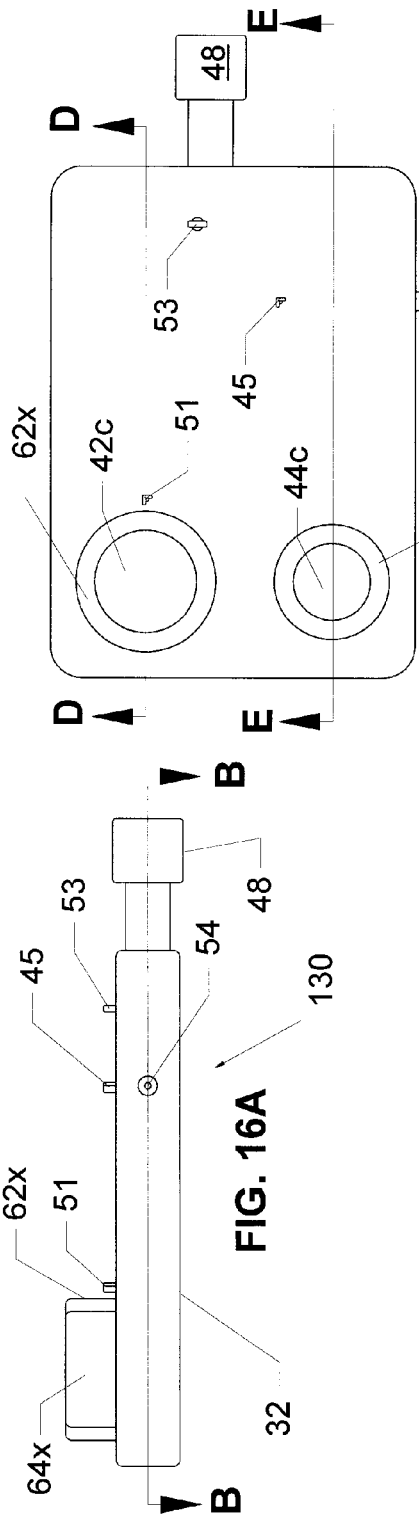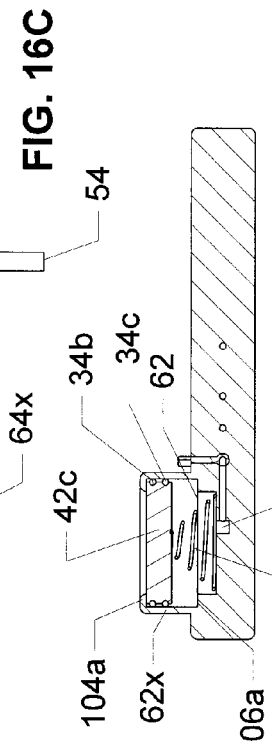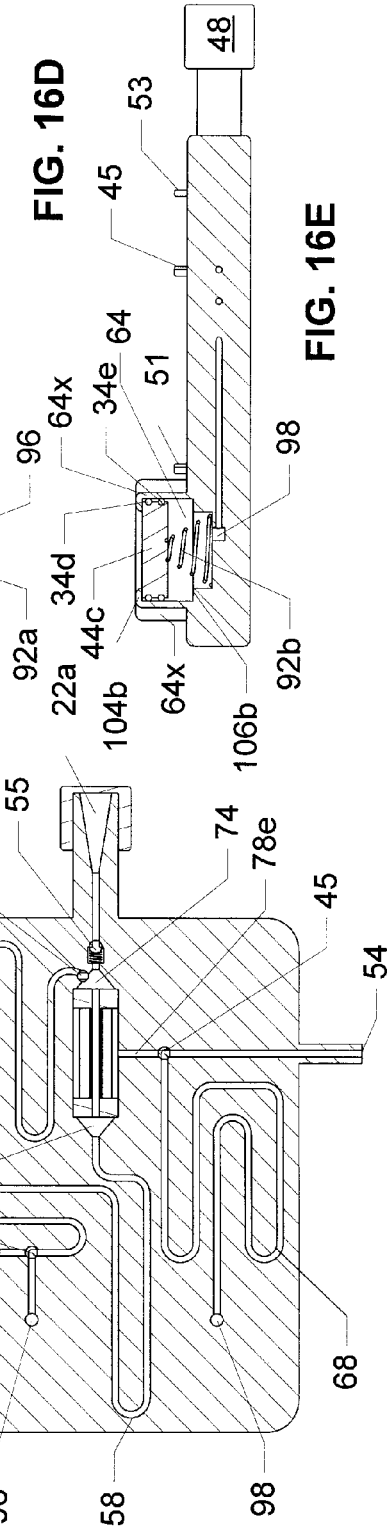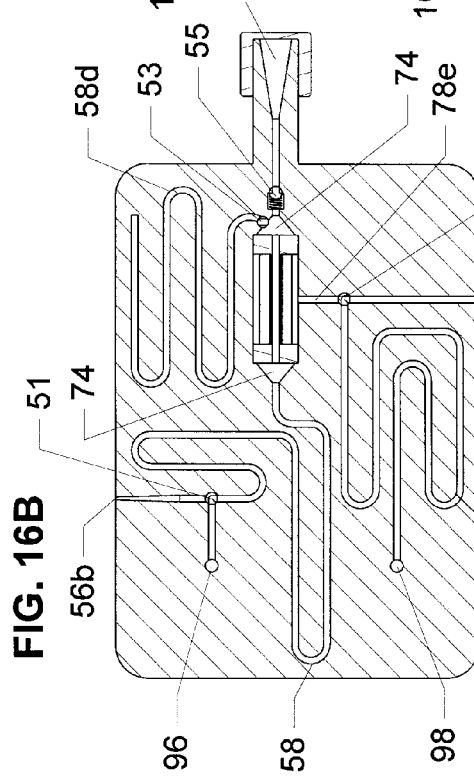

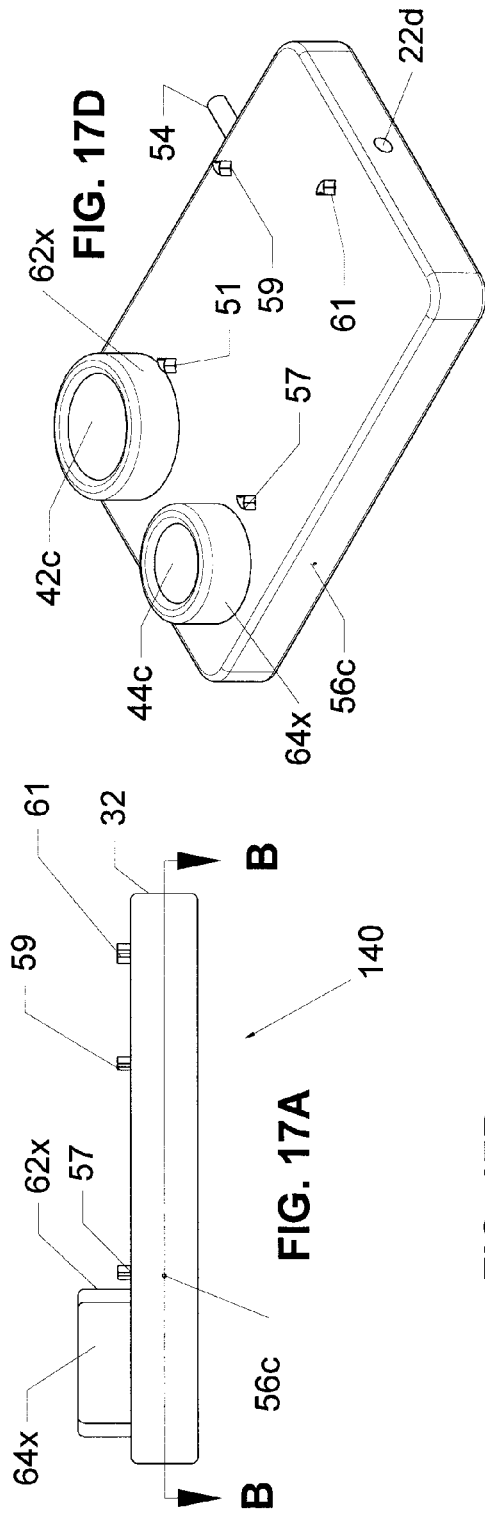
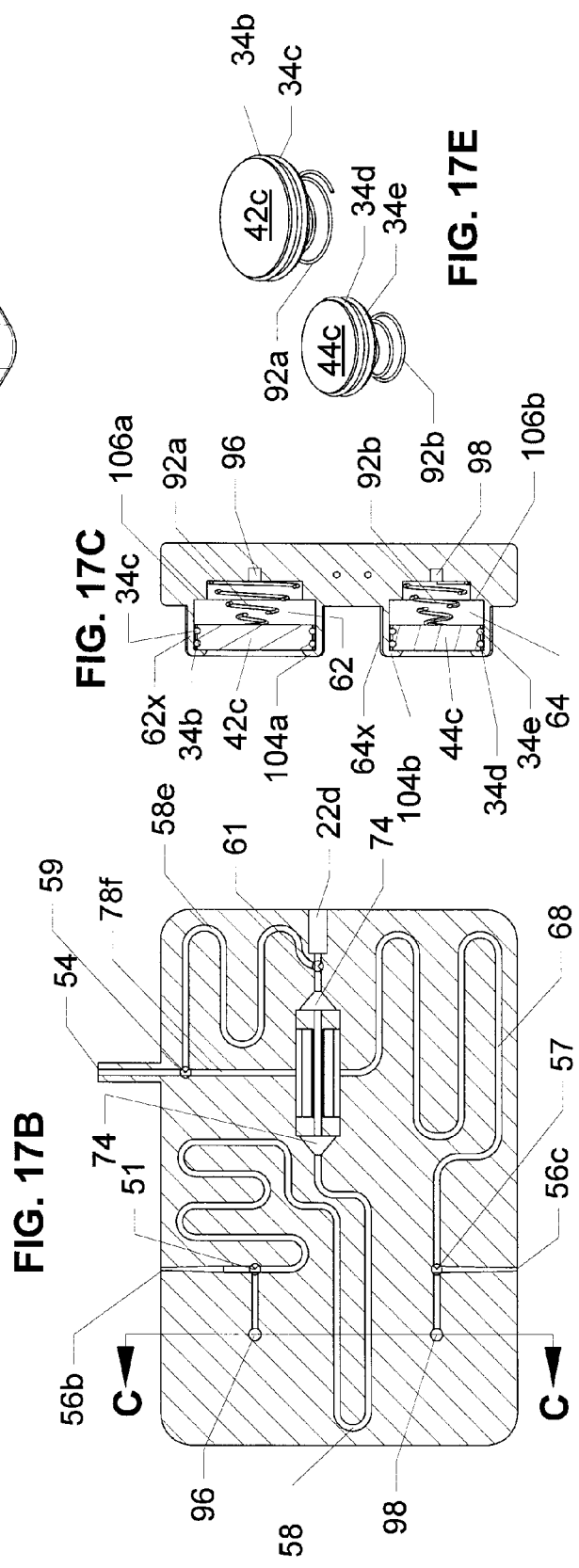

SAMPLE FILTRATION ASSEMBLY

RELATED APPLICATIONS

This application is a Nonprovisional United States patent application, claiming the benefit of U.S. Provisional Patent Application No. 61/510,506, filed 22 Jul. 2011.

FIELD OF THE INVENTION

The invention relates to a filtration assembly that can be used to extract a filtrate from a sample or prepare a concentrate from the sample.

BACKGROUND OF THE INVENTION

Many medical diagnostic tests are performed in a medical laboratory, on serum and plasma. Serum is the yellow liquid obtained from blood after the blood is allowed to clot, and the clot is removed by centrifugation; plasma is the yellow liquid obtained from blood by centrifugation of blood mixed with an anticoagulant, e.g. heparin. Whole blood comprises the formed elements (i.e., the cellular components and the cell-derived components), and plasma. Red blood cells are the most abundant formed elements in blood, and platelets are examples of cell-derived components. In the case of a blood sample, the filtrate usually refers to the blood plasma (or simply, plasma), depending on the size of the pores in the porous membrane, and the retentate or concentrate usually refers to blood with enriched concentration of cellular components.

For Point-of-Care Testing (POCT), whole blood is usually used because the sample does not have to be processed before testing. If serum and plasma were as easily available as whole blood, the serum and plasma would be preferred because they are not as complex as blood, and therefore serum and plasma would produce more accurate test results. Plasma is usually preferred over serum because the blood needs to sit at room temperature for about half an hour in order to complete the clotting process, and then the serum is extracted by centrifugation of the sample; blood can be centrifuged immediately after the blood is collected in a tube containing an appropriate anticoagulant, in order to extract the plasma from the blood.

The inventor was awarded U.S. Pat. Nos. 7,816,124 and 7,807,450 that disclose cartridges for rapidly extracting plasma from blood. These cartridges can be used to virtually collect plasma directly from a patient's blood vessel or from some other blood supply. The cartridges use negative pressure created by manually compressing flexible members of compression chambers, for creating blood flow, and for pulling plasma from whole blood across a membrane. U.S. Pat. Nos. 7,816,124 and 7,807,450 describe the use of the thumb and forefinger for compressing flexible members of blood and plasma compression chambers. U.S. Pat. Nos. 7,816,124 and 7,807,450 also described flexible members that possess physical properties that will allow the flexible members to rebound at desired speed. Nevertheless, there is still a need for an apparatus that extracts plasma from blood in a simpler and more efficient manner. Particularly, there is a need for a cartridge that can be used instead of an evacuated tube, whereby no centrifugation has to be performed in order to extract the plasma.

There is also a need to extract an ultra-filtrate from a sample, for example serum or plasma, without the need for centrifugation. Many therapeutic drugs, ions and hormones are highly protein bound. Only the free therapeutic drugs, ions and hormones are available to cross vascular walls and biological membranes in order to interact with biologically important binding sites. Some examples of a therapeutic drug, an ion and hormone are phenytoin, calcium and thyroid hormones (T3 and T4) respectively.

Phenytoin, for example, is a therapeutic drug used to treat epilepsy. In the blood, about 90% of the phenytoin is bound to plasma proteins. Only the portion of phenytoin that is unbound or "free" is pharmacologically or biologically active. A test for total phenytoin represents the sum of the bound and unbound phenytoin. Under normal conditions, the balance between bound and unbound phenytoin in the blood is relatively stable, so measuring the total phenytoin is appropriate for monitoring therapeutic levels of phenytoin. However, in certain conditions and disease states, that balance can be upset, causing the percentage of free or active phenytoin to increase. Consequently, a patient may experience symptoms of phenytoin toxicity even though the total phenytoin result falls within a therapeutic range. In such cases, doctors may order a free phenytoin test to more reliably monitor the patient's phenytoin levels, instead of a test for total phenytoin.

One method used to measure free phenytoin in a patient's serum or plasma sample involves: 1) adding the patient's sample to the sample reservoir of an ultra-filtration device; 2) capping the sample reservoir; 3) placing the ultra-filtration device in a centrifuge and centrifuging for about 25 minutes; and 4) measuring total phenytoin in the ultra-filtrate of the serum or plasma.

As in the case of extracting plasma from whole blood, there is a need to eliminate the step of centrifugation in order to measure free phenytoin. Because the size of the proteins that bind phenytoin is larger than the pore size of the membrane in the ultra-filtration device, the bound phenytoin cannot travel with the ultra-filtrate.

In the case of a serum or plasma sample, the filtrate (or more appropriately, referred to as an ultra-filtrate) usually refers to the serum or plasma containing the smaller molecular weight substances like the free phenytoin, and the retentate usually refers to serum or plasma containing the higher molecular weight substances like the proteins that bind phenytoin. An example of such a protein is albumin, having a molecular weight of about 66 kilodaltons. In contrast, the molecular weight of phenytoin is about 0.25 kilodaltons. A person of ordinary skill in the art will appreciate that an ultra-filtrate is still a filtrate, and the term ultra-filtrate is only used for clarity when the starting sample is plasma, for example, which is already considered to be a filtrate of blood. By way of examples only, some embodiments of a cartridge or filtration assembly can be used to perform the following: extract plasma from whole blood; extract cell-free liquid from a non-blood sample comprising cells; extract a plasma ultra-filtrate containing a free drug/hormone from plasma; and concentrate the drug/hormone or cellular components of a sample. Some advantages of the embodiments of the present invention over U.S. Pat. Nos. 7,816,124 and 7,807,450 awarded to the inventor will be described.

SUMMARY OF THE INVENTION

According to an aspect of an embodiment of the invention there is provided a filtration assembly for preparing a filtrate or a retentate from a liquid sample, the assembly comprising: a) a housing; b) an inlet in the housing for receiving the liquid sample; c) a filtration chamber comprising a membrane having a retentate side and a filtrate side; d) a retentate flow path in the housing comprising the retentate side of the membrane and a dead-end channel for trapping air; e) means for compressing and decompressing the air in the dead-end channel to facilitate filtration of the liquid sample across the membrane; and f) an outlet for removing at least one of the filtrate and the retentate from the housing.

According to yet another aspect of an embodiment of the invention, there is provided a filtration assembly for preparing a filtrate or a retentate from a liquid sample, the assembly comprising: a) a housing; b) an inlet in the housing for receiving the liquid sample; c) a filtration chamber comprising a membrane having a retentate side and a filtrate side; d) a retentate flow path in the housing comprising the retentate side of the membrane; e) a filtrate flow path beginning at the filtrate side of the membrane and terminating at a manually operable filtrate compression chamber comprising a frictionally engaged plunger for modulating pressure inside the manually operable filtrate compression chamber; and f) an outlet for removing at least one of the filtrate and the retentate from the housing.

According to yet another aspect of an embodiment of the invention, there is provided a filtration assembly for preparing a filtrate from a liquid sample, the assembly comprising: a) a housing; b) an inlet in the housing for receiving the liquid sample, the inlet having a pierceable septum; c) a filtration chamber comprising a membrane having a retentate side and a filtrate side; d) a retentate flow path in the housing comprising the retentate side of the membrane and a manually operable retentate compression chamber; and e) an outlet for removing the filtrate from the housing.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which:

FIG. 2A is schematic drawing showing details a double-ended needle assembly 20 shown in FIG. 1A, with an evacuated tube 26 inserted into the tube holder 10;

FIG. 2B is a right side view of the double-ended needle assembly and evacuated tube shown in FIG. 2A;

FIG. 2C is a cross-sectional view through the double-ended needle assembly and evacuated tube shown in FIG. 2A along line C-C;

FIG. 2D is a perspective view of the double-ended needle assembly and evacuated tube shown in FIG. 2A;

FIG. 3A is a schematic drawing showing details of a front view of a filtration assembly 30 suitable for extraction of a filtrate from a sample according to a first embodiment of the invention;

FIG. 3B is a top view of the assembly 30 shown in FIG. 3A;

FIG. 3C is a cross-sectional view through the assembly 30 shown in FIG. 3A along line C-C;

FIG. 3D is a detailed view of the detail D shown in FIG. 3C, showing a schematic representation of the filtration chamber;

FIG. 4A is a schematic drawing showing details of a top view of the assembly 30 shown in FIG. 3A inserted into the tube holder 10 of the double-ended needle assembly 20 shown in FIG. 1A;

FIG. 4B is a first cross-sectional view through the filtration assembly 30 shown in FIG. 4A along line B-B;

FIG. 4C is a second cross-sectional view through the filtration assembly 30 and double-ended needle assembly 20 shown in FIG. 4A along line C-C;

FIG. 4D is a perspective view of the assemblies shown in FIG. 4A;

FIG. 6A is a schematic drawing showing details of a front view of a filtration assembly 40 suitable for extraction of a filtrate from a sample according to a second embodiment of the invention;

FIG. 6B is a first cross-sectional view through the assembly 40 shown in FIG. 6A along line B-B;

FIG. 6C is a second cross-sectional view through the assembly 40 shown in FIG. 6B along line C-C;

FIG. 7A is a schematic drawing showing details of a front view of a filtration assembly 50 suitable for extraction of a filtrate from a sample according to a third embodiment of the invention, engaged with a hollow needle assembly 144;

FIG. 7B is a cross-sectional view through the assemblies shown in FIG. 7A along line B-B;

FIG. 7C is a perspective view of the assemblies shown in FIG. 7A;

FIG. 8A is a schematic drawing showing details of a front view of a filtration assembly 60 suitable for extraction of filtrate from a sample according to a forth embodiment of the invention;

FIG. 8B is a perspective view of the assembly 60 shown in FIG. 8A;

FIG. 8C is a cross-sectional view through the filtration assembly 60 shown in FIG. 8A along line C-C;

FIG. 9 is a self-explanatory illustration of a plurality of positions of 3-way and 4-way valves, showing Type-T and Type-L;

FIG. 10A is a schematic drawing showing details of a front view of a filtration assembly 70 suitable for extraction of filtrate from a sample according to a fifth embodiment of the invention;

FIG. 10B is a first cross-sectional view through the filtration assembly 70 shown in FIG. 10A along line B-B;

FIG. 10C is a second cross-sectional view through the filtration assembly 70 shown in FIG. 10B along line C-C;

FIG. 11A is a schematic drawing showing details of a front view of a filtration assembly 80 suitable for extraction of filtrate from a sample according to a sixth embodiment of the invention;

FIG. 11B is a top view of the filtration assembly 80 shown in FIG. 11A;

FIG. 11C is cross-sectional view through the filtration assembly 80 shown in FIG. 11A along line C-C;

FIG. 11D is a perspective view of the filtration assembly 80 shown in FIG. 11A;

FIG. 12A is a schematic drawing showing details of a front view of a filtration assembly 90 suitable for extraction of filtrate from a sample according to a seventh embodiment of the invention;

FIG. 12B is a first perspective view of the filtration assembly 90 shown in FIG. 12A FIG. 12C is a cross-sectional view through the filtration assembly 90 shown in FIG. 12A along line C-C;

FIG. 12D is a second perspective view of the filtration assembly 90 shown in FIG. 12A;

FIG. 13A is a schematic drawing showing details of a perspective view of a filtration assembly 100 suitable for extraction of filtrate from a sample according to a eight embodiment of the invention, with a syringe 184 attached;

FIG. 13B is a front view of the filtration assembly 100 shown in FIG. 13A, with a syringe 184 attached;

FIG. 13C is cross-sectional view through the filtration assembly 100 shown in FIG. 13B along line C-C, showing opening 54b absent syringe 184;

FIG. 14A is a schematic drawing showing details of a front view of a filtration assembly 110 suitable for extraction of filtrate from a sample according to a ninth embodiment of the invention;

FIG. 14B is a top view of the filtration assembly 110 shown in FIG. 14A;

FIG. 14C is a cross-sectional view through the filtration assembly 110 shown in FIG. 14A along line C-C;

FIG. 14D is a perspective view of the filtration assembly 110 shown in FIG. 14A.

FIG. 15A is a schematic drawing showing details of a front view of a filtration assembly 120 suitable for extraction of filtrate from a sample according to a tenth embodiment of the invention, with a syringe 184b attached;

FIG. 15B is a cross-sectional view through the filtration assembly 120 shown in FIG. 15A along line B-B;

FIG. 15C is a perspective view of the filtration assembly 120 shown in FIG. 15A, showing inlet opening 22c absent syringe 184b;

FIG. 15D is a cross-sectional view through the filtration assembly 120 and syringe 184b shown in FIG. 15B along line D-D;

FIG. 15E is an enlarged perspective view of a pivotal frictionally engaged plunger 44b of the compression chamber 64 shown in FIG. 15D.

FIG. 16A is a schematic drawing showing details of a front view of a filtration assembly 130 suitable for extraction of filtrate from a sample according to an eleventh embodiment of the invention;

FIG. 16B is a first cross-sectional view through the filtration assembly 130 shown in FIG. 16A along line B-B;

FIG. 16C is a top view of the filtration assembly 130 shown in FIG. 16A;

FIG. 16D is a second cross-sectional view through the filtration assembly 130 shown in FIG. 16C along line D-D;

FIG. 16E is a third cross-sectional view through the filtration assembly 130 shown in FIG. 16C along line E-E;

FIG. 17A is a schematic drawing showing details of a front view of a filtration assembly 140 suitable for extraction of filtrate or concentrate from a sample according to a twelfth embodiment of the invention;

FIG. 17B is a first cross-sectional view through the filtration assembly 140 shown in FIG. 17A along line B-B;

FIG. 17C is a second cross-sectional view through the filtration assembly 140 shown in FIG. 17B along line C-C;

FIG. 17D is a perspective view of the filtration assembly 140 shown in FIG. 17A; and FIG. 17E is a perspective view of the filtration assembly 140 shown in FIG. 17D, with all the parts hidden except the plungers 42c and 44c, and the corresponding springs 92a and 92b.

DETAILED DESCRIPTION OF PREFERRED EMBODIMENTS

Figure 1B:
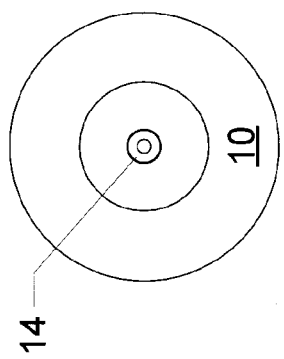
FIG. 1B is a right side view of the double-ended needle assembly shown in FIG. 1A.

Several embodiments of a filtration assembly and their advantages over the prior art are discussed. A basic filtration chamber comprises a sample inlet, a porous membrane (also referred to as a filter, a membrane or a membrane filter) of any configuration, a sample outlet for outflow of sample that does not penetrate the membrane (referred to as the retentate or concentrate), and an outlet for the sample that penetrates the membrane (referred to as the filtrate). The sample is usually a liquid, absent cellular components or comprising cellular components. An example of a liquid absent cellular components is plasma, and an example of a liquid that comprises cellular components is whole blood (also referred to as blood). The sample introduced at the inlet of the filtration assembly is referred to as the primary sample.

Although blood is used as an example of a primary sample comprising cellular components, when describing some of the embodiments, one of ordinary skill in the art will appreciate that the invention is not limited to processing blood, serum or plasma.

In order to illustrate most of the embodiments of the present invention clearly, reference is made to blood as the sample because blood was the sample and plasma extracted from the blood was the filtrate described in the prior art (U.S. Pat. Nos. 7,816,124 and 7,807,450), and because it's easier to describe the invention using one or more than one blood flow path and one or more than one plasma flow path.

In order to appreciate some aspects of the embodiments illustrated in the figures provided, and examples of usefulness, relevant prior art is provided in FIGS. 1A-1D and 2A-2D. Prior to the invention of the double-ended needle, single ended needles attached to syringes were used to draw blood from a patient's blood vessel. A single ended needle refers to a hypodermic needle with a sharp open end for insertion into a patient's blood vessel, and a blunt open end for engagement with a syringe. By way of an example, a double-ended needle assembly is illustrated as assembly 20 shown collectively in FIGS. 1A-1E. A double-ended needle assembly refers to an apparatus commonly used to draw blood from a patient, having a blood supply end and a collection end. Both ends are sharp and open. During use, the blood supply end is inserted in the patient's blood vessel. The collection end is used to pierce the septum or cap of an evacuated tube. The negative pressure in the evacuated tube causes blood to flow from the patient into the evacuated tube. The blood draw, i.e., the maximum amount of blood that is allowed to enter the tube, depends on the magnitude of the negative pressure in the tube. The blood supply end and the collection end in some double-ended needle assemblies are connected by a piece of tubing of any desired length. An example of a double-ended needle assembly is illustrated in FIGS. 1A-1D. In this example, the double-ended needle is of rigid construction, showing the sharp portion 12 of the blood supply end, and the sharp portion 16 of the blood collection end.

Figure 1E:
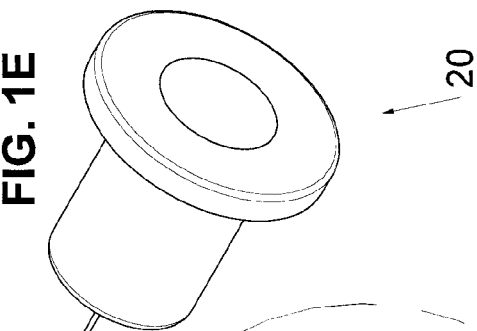
FIG. 1E is a perspective view of the double-ended needle assembly shown in FIG. 1A.
Figure 1D:
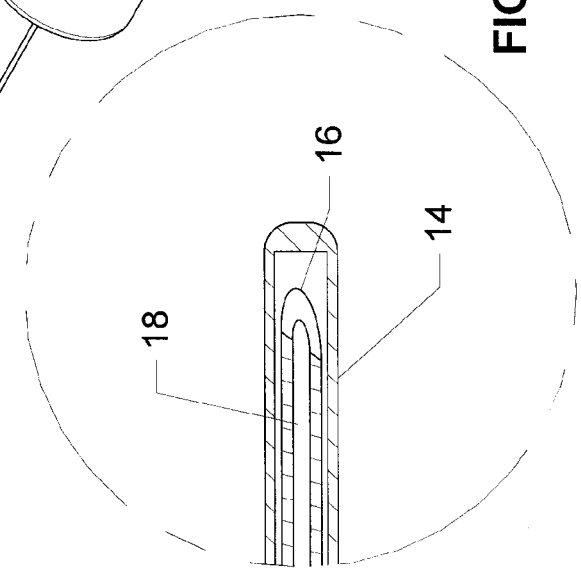
FIG. 1D is a detailed view of the detail D shown in FIG. 1C.
Figure 1A:
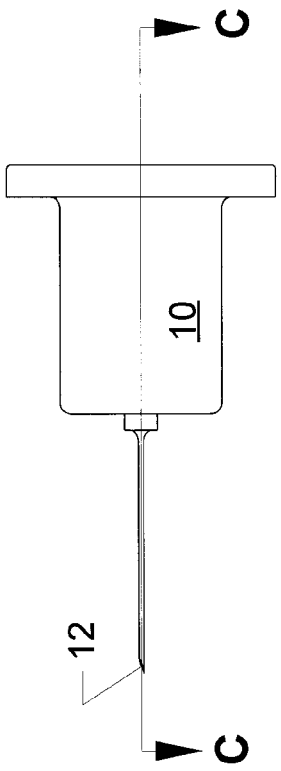
FIG. 1A is a schematic drawing showing details of a top view of double-ended needle assembly 20, which may be used with some embodiments of the present invention.
Figure 1C:
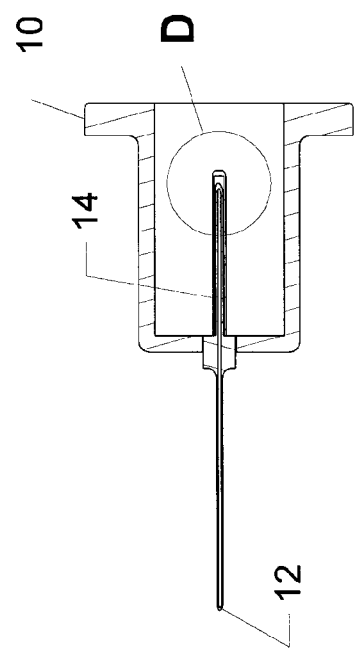
FIG. 1C is a cross-sectional view through the double-ended needle assembly shown in FIG. 1A along line C-C.

FIG. 1A is a schematic drawing showing details of a top view of double-ended needle assembly, having an evacuated tube holder 10. FIG. 1B is a right side view of the double-ended needle assembly shown in FIG. 1A. FIG. 1C is a cross-sectional view through the double-ended needle assembly shown in FIG. 1A along line C-C. FIG. 1D is a detailed view of the detail D shown in FIG. 1C. The detailed view of the collection end illustrated in FIG. 1D also shows the lumen 18 of the needle, which runs from the sharp end 16 to the sharp end 12. The collection end 16 is covered with a pierceable and flexible sheath 14, which acts as a valve to prevent blood flow after the sharp end 12 is inserted into the patient's blood vessel. FIG. 1E is a perspective view of the assembly 20.

FIG. 2A is a schematic drawing showing details of a top view of an evacuated tube 26 engaged with the tube holder 10 illustrated in FIG. 1A. FIG. 2B is a right side view of the evacuated tube 26 engaged with the tube holder 10. The evacuated tube 26 is covered with a rubber septum 28. FIG. 2C is a cross-sectional view through the double-ended needle and tube assembly shown in FIG. 2A along line C-C. FIG. 2D is a perspective view of the double-ended needle and tube assembly shown in FIG. 2A. Although FIG. 2C does not show the needle unsheathed, unsheathing the collection end 16 of the needle occurs when the needle is pushed against the septum 28 of the tube 26, allowing blood to flow into the tube.

Referring collectively to FIGS. 3A-3D, shown are schematic drawings illustrating details of a filtration assembly 30 suitable for, for example, extraction of plasma from a whole blood sample according to a first embodiment of the invention. A person of ordinary skill in the art will appreciate that blood is used for illustration only, and the present invention is not limited in any way to processing blood. FIG. 3A is a front view of the filtration assembly 30. FIG. 3B is a top view of the assembly 30 shown in FIG. 3A. FIG. 3C is a cross-sectional view through the apparatus 30 shown in FIG. 3A along line C-C. FIG. 3D is a detailed view of the detail D shown in FIG. 3C, which is a schematic representation of the filtration chamber.

FIG. 3C is used to illustrate some features of the first embodiment of the filtration assembly 30. A septum 48 is shown as a cap placed over the inlet opening 22a of the assembly 30. A septum refers to a wall separating two compartments, preventing fluid communication between the two compartments except when the wall is pierced with, for example, the collection end 16 of a double-ended needle assembly shown in FIG. 1D. A person of ordinary skill in the art will appreciate that although septum 48 is illustrated as a cap-like structure attached to the inlet opening 22a, the septum in some embodiments is an integral part of the housing 32. A feature of the septum 48 is that it temporarily closes the inlet opening 22a of assembly 30, and that the septum 48 is pierceable. However, septum 48 of the present invention is optional, as illustrated in assembly 140, for example, shown in FIGS. 17B and 17D. By being pierceable, the sharp end of a hollow needle can pierce the septum, creating an opening via the lumen of the needle, for causing blood to flow from a blood supply into the blood flow path (defined later) of filtration assembly 30. Therefore, in this embodiment of the invention, the septum is considered to be a component of the inlet of assembly 30. The housing inlet in a filtration assembly refers to the general area around the inlet opening 22a as shown in FIGS. 3B and 3C. A person of ordinary skill in the art will appreciate that the housing inlet also refers to the general area around inlet open 22b of assembly 40 shown in FIGS. 6A and 6B, although the assembly 40 does not include a septum identified as 48 in FIG. 3C. Non-limiting examples of a blood supply are: a patient's blood vessel, blood in a blood bag, blood in a syringe, and blood in an evacuated tube. An advantage of having a septum at the inlet of assembly 30, over the prior art, is that assembly 30 can replace the evacuated tube 26 illustrated in FIGS. 2A-2D, whereby plasma can be obtained without having to centrifuge the blood. Replacing an evacuated tube with assembly 30 is illustrated in FIGS. 4A-4D. A person of ordinary skill in the art will appreciate that in other embodiments of the invention, the inlet opening can be configured as in assembly 140 shown collectively in FIGS. 17A-17E, where the inlet opening is shown as 22d absent the septum 28. The sample can be drawn into assembly 140 using a sipper (a piece of tubing) attached to inlet opening 22d.

Flow path refers to the path along which a fluid is free to travel, but the fluid does not necessarily have to travel the full length of the flow path. Using filtration assembly 30 as an example (see FIG. 3D), a person will appreciate that the blood flow path begins at an opening created by a hollow needle inserted into the septum 48, and terminates at the blood compression chamber 62, using blood as an example of the sample. In more general terms, the blood flow path of assembly 30 comprises inlet opening 22a, blood flow channel 66, chamber 74 of the filtration chamber illustrated in FIG. 3D, valve 33, blood flow channel 58, and blood compression chamber 62. A person of ordinary skill in the art will appreciate that channel 66 is a dead-end channel when the pierceable septum 48 is unpierced, which is the state of the septum after it is pierced by a hollow needle and then the hollow needle is removed. Dead-end channels are discussed in details later. Using filtration assembly 80 as another example (see FIG. 11C), a person of ordinary skill in the art will appreciate that the blood flow path begins at an opening created by a hollow needle inserted into the septum 48, and terminates at the compression chamber 62, and comprises channel 58. One difference in the illustrations is that channel 58 in embodiment 30 appears to be short and straight, and channel 58 in assembly 80 is torturous and therefore longer. By torturous, it is implied that the channel is not straight, and contains any number of bends in order to increase the volume of the channel. It is easier for one to appreciate that although the flow paths in assembly 30 and assembly 80 begin at an opening in the septum 48 and terminate at the compression chamber 62, blood is more likely to flow into the compression chamber 62 of assembly 30, and blood is less likely to reach the compression chamber 62 in assembly 80 due to the long torturous channel 58 in assembly 80. Therefore, although the blood in the blood flow path illustrated in FIG. 11C may stop before entering the compression chamber 62, the blood is free to enter compression chamber 62, depending on factors like the length of the torturous channel 58, and the extent to which the flexible member 42 (see FIG. 11D) of compression chamber 62 of assembly 80 is depressed.

The blood compression chamber 62 comprises a flexible member 42 illustrated in FIGS. 3A and 3B, but some embodiments of the filtration assembly have two flexible members, for example 42a and 42b shown in embodiment 100 illustrated collectively in FIGS. 13A-13C. A person of ordinary skill in the art will appreciate that a compression chamber of the present invention is not limited to one flexible member, and more than one flexible member is within the scope of the invention. An advantage to having the flexible member on the top side of the assembly is so that the bottom side of the assembly is flat for placing the assembly on a flat surface, for ease of use. The volume of the compression chamber 62, and the maximum depression of the flexible members 42, determines the maximum volume of blood that could be drawn into the blood flow path. Also, the rigidity of the flexible member 42, which contributes to the rate at which the members 42 is restored to its original shape after squeezing and releasing, i.e. the rebound of the flexible members 42, determines the velocity of the blood in the blood flow path. An advantage over the prior art (U.S. Pat. Nos. 7,816,124 and 7,807,450) is the disposition of one or more than one valve at strategic locations in the assembly. Several embodiments are shown with valves disposed in different locations in the assembly, and there functions will be described along with the description of the embodiments. Other embodiments are described to illustrate that a compression chamber of the present invention is not limited to one or more than one flexible member, as will be later described for assembly 120 (illustrated collectively in FIGS. 15A-15D), assembly 130 (illustrated collectively in FIGS. 16A-16E) and assembly 140 (illustrated collectively in FIGS. 17A-17E).

A valve is a device that regulates, directs or controls the flow of a fluid by opening, closing, partially obstructing passageways, or redirecting flow of a fluid. Some examples of fluids are: gases, liquids, fluidized solids and slurries. Valves are available in various designs, for example, globe valve, butterfly valve, pinch valve, needle valve, poppet valve, gate valve. Valves are classified by the number of ports they contain: a 2-port valve means that the valve stem contains two ports, but the ports could be aligned along a straight line ("straight" configuration) or in an "L" configuration; a S-port valve means that the valve stem contains three ports, and the ports are usually in a "T" configuration (see FIG. 9). Valves are also classified by how they are actuated, for example manually operable, hydraulically operable, pneumatically operable, solenoid operable or motor operable. Valves are further classified by the operating positions, for example, 1-way valves, 2-way valves, 3-way valves and 4-way valves. Self-explanatory illustrations of valve operating positions for Type-T and Type-L valves are illustrated in FIG. 9. The Type-T and Type-L valves are also referred to as 3-way and 4-way valves or stopcocks. A 1-way valve is also referred to as a check valve that permits flow in only one direction, and the check valve automatically opens when there is sufficient flow in a single direction; flow in the opposite direction closes the valve. A 2-way valve is a valve with one open and one closed position, and flow usually occurs from the side of the valve having fluid pressure, to the side of the valve having lower fluid pressure, and this flow can occur in one of two different directions. A 3-way and a 4-way valve are valves with 3 and 4 operating positions respectively.

The valves and any valve features discussed above are examples only, and shall not limit the scope of the invention in any way, except where a valve is described in specific terms. Illustrations of some embodiments of the filtration apparatus include 1-way, 2-way, 3-way and 4-way valves.

A person of ordinary skill in the art will appreciate that a 3-port valve disposed along a straight channel could function as a "straight" 2-port valve.

The type of valve included in the various embodiments of the present invention is discerned by the shape of the valve handle illustrated in top views of the embodiments. For example: FIG. 14B provides illustration of two "straight" 2-port valves 41 and 49, and two 3-port "T" valves 51 and 45; FIG. 16C provides illustration of one "straight" 2-port valve 53, and two "L" 2-port valves 51 and 45. FIG. 16B also shows a check valve 55, which is not manually operable, and therefore no valve handle is shown in FIG. 16C. It should be understood that these are just examples of valves included in the various embodiments, and they should not be considered limiting in any way, to other similar embodiments.

Still referring to FIG. 3C, the blood flows approximately orthogonal to the hollow membranes of the bundle 76a, and around the hollow membrane 82. Details of the bundle 76a are shown collectively in FIGS. 5A-5D. The blood stays on the blood side 74 of the membrane 82 (see FIG. 3D). The blood flow in this embodiment is also controlled by a manually operable valve 33, which is disposed in the blood flow channel 58. Valve 33 is a "straight" 2-port valve, but as explained previously, a 3-port valve can provide the same function when it is disposed in a straight channel.

An advantage to having valve 33 in the blood flow channel 58, over the prior art, is that by slowly opening the valve, the patient's vein is less likely to collapse, and if it appears that the vein is collapsing, the valve can be closed rendering any negative pressure in the compression chamber 62 ineffective with respect to the patient's vein.

A filtration chamber illustrated in FIG. 3D as detail D of FIG. 3C, is a chamber in a filtration assembly comprising a membrane 82 of a membrane assembly 76a. In this particular embodiment, the membrane assembly 76a is in the form of a hollow fiber bundle, illustrated collectively as FIGS. 5A-5D. The membrane assembly 76a comprises a plasma side 72 and a blood side 74. A plasma reservoir 78 is in fluid connection with the plasma side 72 of the membrane 82. In this embodiment, because the membrane 82 is configured as tubes, the plasma side of the membrane includes the lumen of the membrane tubes. This is not always the case as will be seen in assembly 70 illustrated collectively in FIGS. 10A-10C, where the lumen of the membrane tube is the blood side of the membrane. In some embodiments, the membrane 82 is flat, and a person of ordinary skill in the art will appreciate that the membrane could take on any shape, provided that the membrane allows plasma to travel from the blood side to the plasma side, and a barrier is maintained between the plasma side and the blood side. In this case the primary sample is blood, but the present invention is not limited to processing blood. At the beginning of the filtration process, the primary sample is in contact with the blood side of the membrane. During filtration, the filtrate (in this case, plasma) penetrates the membrane and the filtrate maintains contact with the opposite side of the membrane. After filtration begins, the primary sample becomes converted to retentate (in this case, concentrated blood) and the blood side of the membrane maintains contact with the retentate. For a more general description of a membrane that is not limited to processing blood, the side of the membrane in contact with retentate is referred to as the retentate side, and the side of the membrane in contact with the filtrate is referred to as the filtrate side. In other words, the blood side is more generally referred to as the retentate side and the plasma side is more generally referred to as the filtrate side. Therefore, in more general terms, a blood compression chamber is referred to as a retentate compression chamber. Also, in more general terms, a plasma compression chamber is referred to as a filtrate compression chamber. For consistency, a blood flow path is also referred to as a retentate flow path, and a plasma flow path is also referred to as a filtrate path, in order to include different embodiments of the invention and different primary samples.

Still referring to FIG. 3C, a first plasma flow path begins at the plasma side 72 of the membrane 82, and terminates at a manually operable plasma compression chamber 64. The first plasma flow path comprises a plasma reservoir 78, a plasma flow channel 68 fluidly connecting the plasma side 72 and the plasma compression chamber 64, and a manually operable valve 35 disposed in the plasma flow channel 68. A person of ordinary skill in the art will appreciate that the plasma flow channel 68 is considered to be an extension of the plasma reservoir 78, and plasma reservoir is considered to be an extension of the plasma side 72; these sections are identified in order to explain the plasma flow path. As will be seen in other embodiments, for example FIG. 12C, the plasma flow channel 68 is torturous and has a greater volume than the reservoir 78c.

Referring to the plasma flow path illustrated in FIG. 12C, the plasma flow path is defined as the path along which the plasma is free to travel, beginning at the plasma side 72 of the filtration chamber (see FIG. 3D) and terminating at the plasma compression chamber 64, via a plasma reservoir 78c and a plasma flow channel 68. A person of ordinary skill in the art will appreciate that due to the length of the plasma channel 68 in filtration assembly 90, it is unlikely that plasma will reach the compression chamber 64. An advantage to having a plasma reservoir and a plasma flow channel is the avoidance of plasma flow into the compression chamber, where the plasma could become trapped, depending on the geometry of the plasma compression chamber. Nevertheless, the plasma flow path is defined according to where the plasma is free to travel to and from.

Still referring to FIG. 3C, a second plasma flow path is defined for ejecting plasma from the filtration assembly 30. This second plasma flow path begins at the plasma compression chamber 64, and terminates at a plasma flow path outlet 54, via a manually operable valve 31 in an open position. A cap like cap 122 in filtration assembly 60, illustrated in FIGS. 8B and 8C, and which is disclosed in the prior art, can be used as a valve, but a manually operable valve 31 offers the following advantages over a cap 122: a) the valve is an integral part of the assembly and cannot be misplaced, whereas a cap can easily be misplaced; b) a valve is less cumbersome to manually open and close compared with attaching and removing a cap; c) a valve provides more secured closure of a passage, whereas a cap is easily dislodged creating an open passage; and d) a valve can be opened to various degree, providing the flow required, whereas a cap provides either a fully open passage or a fully closed passage. Therefore, since the cap 122 is not an integral part of the filtration assembly 60, the cap is not implied when reference is made to a valve. Moreover, even if a cap like the cap 122 is attached to a filtration assembly, the cap is still not implied when reference is made to a valve.

Regarding the first and second plasma flow paths of assembly 30 illustrated in FIG. 3C, the distal part of the first plasma flow path overlaps with the proximal part of the second flow path. Proximal part of a member refers to the part nearest the point of origin, and the distal part of the member is refers to the part opposite to the proximal part, i.e. towards the other end. In the case of a flow path, the proximal part refers to the part of the flow path where flow begins, and the distal part refers to the part of the flow path where flow ends. The plasma compression chamber 64 of assembly 30 is an essential component of the first plasma flow path and the second plasma flow path. In the first plasma flow path, the flexible member 44 of the compression chamber 64 is in a depressed state and functions by creating negative pressure when the depressed flexible member 44 rebounds; in the second plasma flow path, the flexible member 44 of the compression chamber 64 is in a normally expanded state and functions by creating positive pressure when the flexible member 44 is depressed.

Still referring to FIG. 3C is shown an optional vent 56a and a manually operable 3-port Type-T valve 35 for opening and closing the vent, as well as maintaining fluid connection between plasma compression chamber 64 and the plasma reservoir 78. In the prior art, it is recognized that the apparatus performs more efficiently when there is a delay in rebound of the plasma compression chamber flexible member, allowing the blood to first fill the filtration chamber. Valve 35 regulates the pressure in the first plasma flow path. When the filtration chamber is filled with blood, the blood side of the membrane becomes sealed, making the plasma compression chamber more effective.

Also shown in FIGS. 3B and 3C is a structure 52 for housing the outlet 54, and a tube-like structure 46 that allows one to use a double-ended needle assembly, for example assembly 20 show in FIGS. 1A-1D, as explained previously regarding tube 26 shown in FIG. 2A.

Referring collectively to FIGS. 4A-4D, shown are schematic drawings showing details of the assembly 30 shown collectively in FIGS. 3A-3D in the holder 10 of the double-ended needle assembly 20 shown collectively in FIGS. 1A-1D. FIG. 4A is a top view of the assemblies 30 and 20. FIG. 4B is a first cross-sectional view through the assembly 30 shown in FIG. 4A along line B-B. FIG. 4C is a second cross-sectional view through the assemblies 30 and 20 shown in FIG. 4A along line C-C. FIG. 4D is a perspective view of the assemblies 30 and 20 shown in FIG. 4A.

Figure 5B:
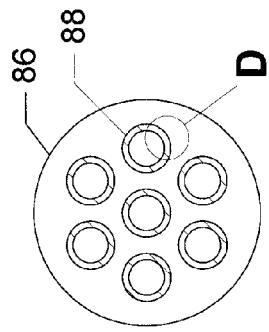
FIG. 5B is a cross-sectional view through the hollow fiber membrane bundle 76a shown in FIG. 5A along line B-B.
Figure 5D:
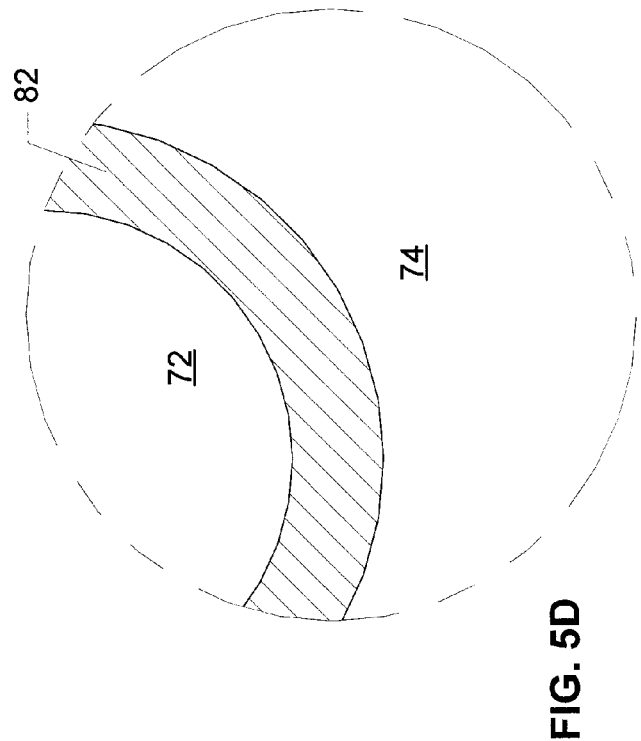
FIG. 5D is a detailed view of detail D shown in FIG. 5B showing a schematic representation of the membrane 82.
Figure 5A:
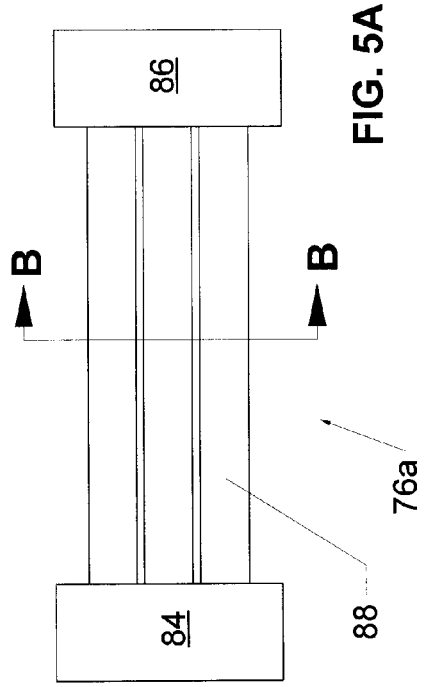
FIG. 5A is schematic drawing showing details of a hollow fiber membrane bundle 76a shown in FIGS. 3C and 3D.
Figure 5C:
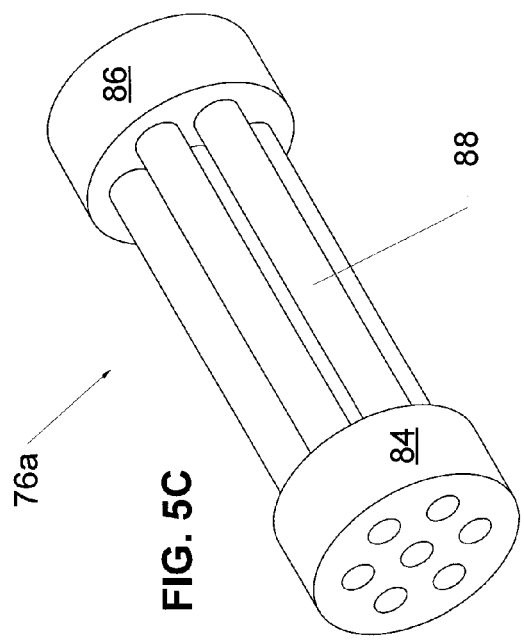
FIG. 5C is a perspective view of the hollow fiber membrane bundle 76a shown in FIG. 5A.

Referring collectively to FIGS. 5A-5D, shown are schematic drawings illustrating details of the hollow fiber bundle (also referred to as a hollow fiber filter bundle, and also hollow fiber membrane bundle) 76a shown inside the body 32 of the apparatus 30 illustrated collectively in FIGS. 3A-3D. FIG. 5A is schematic drawing showing details of a hollow fiber membrane bundle 76a shown in FIGS. 3C and 3D. FIG. 5B is a cross-sectional view through the hollow fiber membrane bundle 76a shown in FIG. 5A along line B-B. FIG. 5C is a perspective view of the hollow fiber membrane bundle 76a shown in FIG. 5A. FIG. 5D is a detailed view of detail D shown in FIG. 5B showing a schematic representation of the membrane 82.

Assembly 30 comprises a hollow fiber membrane or filter bundle 76a. The hollow fiber filters in the hollow fiber filter bundle 76a run approximately orthogonal to the blood flow in the blood flow path of assembly 30. In an alternative apparatus 70 illustrated collectively in FIGS. 10A-10C, the hollow fiber filters in the hollow fiber filter bundle 76a run approximately parallel to the blood flow in the blood flow path. The hollow fiber filter bundle 76a in this embodiment comprises seven hollow fiber filters (or referred to as membrane tubes), held together by two flanges 84 and 86. As an example, seven hollow fiber filters are shown tightly inserted inside perforations in the flange 84. As shown in FIG. 5B, flange 86 is similarly perforated. In some embodiments, only one flange needs to be perforated, for example the bundle 76b shown in FIG. 11C. Since plasma does not flow through the hollow fibers in bundle 76b, perforations are only required in the flange through which plasma flows, however the bundle will still function if both flanges were perforated, for example, bundle 76a shown in FIG. 12C (assembly 90). The membrane tubes are sealed at the juncture of the hollow fibers and the flange. The wall 82 of the membrane is porous, and in some embodiments, the pores have an approximate distribution of pore diameters ranging from about 0.1 micrometer to about 30 micrometers, and in some embodiments the thickness of the wall 82 ranges from about 0.1 mm to about 0.5 mm. In some embodiments, the internal diameter of the hollow fiber filters ranges approximately from about 0.1 mm to about 1 mm. These pore sizes are more suitable for preventing cells of comparable sizes from penetrating the membrane, but one of reasonable skill in the art will appreciate that various combination of pore sizes, wall thicknesses, and internal diameters of the hollow fiber filters could be used, and are within the scope of the invention. For example, when the sample is plasma, the size of the pores will depend on the molecular weight of the substances one wants to keep in the retentate, i.e., substances that do not penetrate the membrane. A person of ordinary skill in the art will appreciate that a flange can be substituted with potting material that serves to provide a barrier between the retentate and the filtrate. The potting material could be liquid resin that is allowed to solidify after application, for example at the site occupied by the flanges shown in FIG. 6B.

A person of ordinary skill in the art will appreciate the membrane 82 is a partition between the blood flow path (more generally referred to as the retentate flow path, when the primary sample is any liquid), and the plasma flow path (more generally referred to as the filtrate path, when the primary sample is any liquid). Moreover, the filtrate flow path includes the lumen 72 of the hollow fiber filters, and the retentate flow path includes the exterior of the hollow fiber filters. A reversed design is illustrated collectively in FIGS. 10A-10C, where the retentate flow path includes the lumen of the hollow fiber filters 76a, and both flanges must be perforated; the filtrate flow path includes the exterior surface of the hollow fiber filters.

The periphery of the flanges 84 and 86 are sealed in the body 32 of the assembly 30, to separate the blood flow path (a portion shown as 74 in FIG. 3D) from the plasma flow path (a portion shown as 72 in FIG. 3D). In this embodiment of the apparatus, the flanges are a schematic representation of the seal between the blood flow path, and the plasma flow path. From a manufacturing perspective, it is preferred that the hollow fiber filters are assembled in bundles (e.g. 76a), and sandwiched in position between the top and bottom halves of the assembly. As mentioned before, the hollow fibers can be installed in the housing 32 using potting material at the time of installation, instead of prefabricating the bundles with flanges. In some embodiments, the housing 32 comprises a top and a bottom portion, and double-sided sticky gasket is used to assemble the top and bottom portions of the assembly.

In some embodiments of the assembly, at least the first section of the blood flow path is coated with an appropriate anticoagulant, to minimize clotting and promote fluidity of the blood. Anticoagulant could also be impregnated in a piece of filter material, dried and inserted at the beginning of the blood flow path. Fluidity of the blood provides more efficient plasma extraction. However, when the blood sample is already anticoagulated (i.e., blood mixed with an anticoagulant, for example, heparin) in a tube, an anticoagulant within the flow paths of the apparatus is not essential.

Referring collectively to FIGS. 6A-6C, shown are schematic drawings illustrating details of a filtration assembly 40 suitable for extraction of plasma from a whole blood sample according to a second embodiment of the invention. FIG. 6A is a front view of the filtration assembly 40. FIG. 6B is a first cross-sectional view through the assembly 40 shown in FIG. 6A along line B-B. FIG. 6C is a second cross-sectional view through the assembly 40 shown in FIG. 6B along line C-C.

The filtration assembly 40 is similar to filtration assembly 30 illustrated collectively in FIGS. 3A-3D, and accordingly, some elements common to them share common reference numerals. Some reference numerals are altered with a letter at the end, indicating that the elements are similar but some differences may exist. The first difference is that valve 33 is replaced with manually operable valve 37 disposed in the blood flow path as shown. The second difference is that assembly 40 does not have vent 56a and valve 35. The third difference is that assembly 40 has a structure 46b for engaging the hub of a hollow needle, and does not have a pierceable septum 48. Valve 37 is advantageous to assembly 40 since the inlet opening 22b is not covered with a pierceable septum.

Referring collectively to FIGS. 7A-7C, shown are schematic drawings illustrating details of a filtration assembly 50 suitable for extraction of plasma from a whole blood sample according to a third embodiment of the invention, with a hollow needle assembly 144 attached. FIG. 7A is a front view of the filtration assembly 50, engaged with a hollow needle assembly 144. FIG. 7B is a cross-sectional view through the assemblies shown in FIG. 7A along line B-B. FIG. 7C is a perspective view of the assemblies shown in FIG. 7A.

The filtration assembly 50 is similar to filtration assembly 40 illustrated collectively in FIGS. 6A-6C, and accordingly, some elements common to them share common reference numerals. Some reference numerals are altered with a letter at the end, indicating that the elements are similar but some differences may exist. The first difference is that assembly 50 has separate manually operable valves in the blood flow path (valve 33) and plasma flow path (valve 39), and does not have a valve between the inlet opening and the filtration chamber, i.e., valve 37 shown in FIG. 6B. The attached needle assembly 144 comprises a hub 148 with threads, a shaft with a sharp open end 156, and a barrel 146 with threads that mate with the hub threads. The threads allow the sharp open end 156 to be sheathed and unsheathed with the barrel 146.

Referring collectively to FIGS. 8A-8C, shown are schematic drawings illustrating details of a filtration assembly 60 suitable for extraction of plasma from a whole blood sample according to a forth embodiment of the invention. FIG. 8A is a front view of a filtration assembly 60. FIG. 8B is a perspective view of the assembly 60 shown in FIG. 8A. FIG. 8C is a cross-sectional view through the filtration assembly 60 shown in FIG. 8A along line C-C.

The filtration assembly 60 is similar to filtration assembly 30 illustrated collectively in FIGS. 3A-3D, and accordingly, some elements common to them share common reference numerals. Some reference numerals are altered with a letter at the end, indicating that the elements are similar but some differences may exist. The first difference is that assembly 60 has a cap 122 instead of the valve 31 at the second plasma flow path outlet of assembly 30 illustrated in see FIG. 3C. The second difference is that valve 39 in assembly 60 is not vented (see vent 56a of assembly 30 shown in FIG. 3C).

Referring collectively to FIGS. 10A-10C, shown are schematic drawings illustrating details of a filtration assembly 70 suitable for extraction of plasma from a whole blood sample according to a fifth embodiment of the invention. FIG. 10A is a front view of a filtration assembly 70. FIG. 10B is a first cross-sectional view through the filtration assembly 70 shown in FIG. 10A along line B-B. FIG. 10C is a second cross-sectional view through the filtration assembly 70 shown in FIG. 10B along line C-C.

The filtration assembly 70 is similar to filtration assembly 30 illustrated collectively in FIGS. 3A-3D, and accordingly, some elements common to them share common reference numerals. Some reference numerals are altered with a letter at the end, indicating that the elements are similar but some differences may exist. The first difference is that assembly 70 allows the blood to flow through the lumen of the membrane tubes. Therefore, the plasma side and the blood side of the membrane are reversed in assembly 70, relative to assembly 30. The second difference is that there is no valve in assembly 70 corresponding to valve 33 in assembly 30, shown in FIG. 3C. The third difference is that there is no valve and vent in assembly 70 corresponding to valve 35 and vent 56a in assembly 30, shown in FIG. 3C.

Referring collectively to FIGS. 11A-11D, shown are schematic drawings illustrating details of a filtration assembly 80 suitable for extraction of plasma from a whole blood sample according to a sixth embodiment of the invention. FIG. 11A is a front view of the filtration assembly 80. FIG. 11B is a top view of the filtration assembly 80 shown in FIG. 11A. FIG. 11C is cross-sectional view through the filtration assembly 80 shown in FIG. 11A along line C-C. FIG. 11D is a perspective view of the filtration assembly 80 shown in FIG. 11A.

The filtration assembly 80 has some similarities to filtration assembly 30 illustrated collectively in FIGS. 3A-3D, and accordingly, some elements common to them share common reference numerals. Some reference numerals are altered with a letter at the end, indicating that the elements are similar but some differences may exist. Some elements of assembly 80 are described next.

Referring to FIG. 11C, assembly 80 comprises an auxiliary blood flow channel 58b for creating an auxiliary flow path. The auxiliary blood flow path begins at a manually operable 3-port valve 43 and terminates at a second blood compression chamber 62b having a flexible member 42b for operating the compression chamber 62b. This auxiliary blood flow path is not a complete flow path, and is used to define a second blood flow path. The advantage of the auxiliary blood flow path is to increase the plasma yield by rerouting the blood through the filtration chamber more than once. During the first pass of the blood through the filtration chamber, the 3-port valve 43 is positioned so that the auxiliary blood flow path is not fluidly connected to the first blood flow path, which begins at inlet opening 22a and terminates at the first blood compression chamber 62. As shown in FIG. 11C, the first blood flow path is analogous to the blood flow path in assembly 30 (see FIG. 3C), except that the first blood flow path shown in FIG. 11C is torturous, to prevent the blood from entering the compression chamber 62, and valve 43 in assembly 80 replaces valve 33 in assembly 30. In operation, after blood enters the filtration chamber and channel 58, valve 43 is turned so that inlet opening 22a is no longer fluidly connected to the filtration chamber and instead, the auxiliary blood flow path becomes fluidly connected to the filtration chamber. At this position of valve 43, a second blood flow path is created, which begins at the first blood compression chamber 62, and terminates at the second blood compression chamber 62b. After opening valve 41, and bleeding air out of the second blood compression chamber 62b through vent 56b by depressing flexible member 42b, the blood can be pulled through the filtration chamber by releasing flexible member 42b after closing valve 41; blood flow through the filtration chamber can be increased by depressing flexible member 42 of the first blood compression chamber 62.

Still referring to FIG. 11C, shown is a second plasma flow path that includes channel 68 and flows away from the filtration chamber instead of through the filtration chamber. The second plasma flow path begins at the manually operable plasma compression chamber 64 and terminates at outlet 54. The second plasma flow path has an outlet tubing 52 directed away from the filtration chamber, with the aid of a 3-port valve 45 located at the intersection of the first plasma flow path and the flow direction in tubing 52. As defined for assembly 30, a first plasma flow path begins at the plasma side 72 of the membrane 82, and terminates at a manually operable plasma compression chamber 64. An advantage of the second plasma flow path of assembly 80 over the prior art is that extracted plasma can be stored in the torturous channel plasma flow channel 68 for later use, and when the stored plasma is required, it is ejected through the outlet 54 of the second plasma flow path, bypassing the filtration chamber. In this embodiment, plasma flow channel 68 functions as the main plasma reservoir. The formed elements of the blood can rupture more easily during storage, and substances released from the formed elements can diffuse across the membrane into the plasma, if the plasma was stored in the reservoir 78 of embodiment 30 shown in FIG. 3C. Bypassing the filtration chamber in embodiment 80 eliminates the risk of contaminating the plasma with the contents of the formed elements.

Plasma reservoir 78b in embodiment 80 (see FIG. 11C) is drawn to appear smaller than the plasma reservoir 78 in embodiment 30 shown in FIG. 3C. It is advantageous to make the volume of 78b as small as possible since the plasma flows away from the filtration chamber instead of through it, making 78b dead volume. The next embodiment provides a way to recover some of the plasma in the dead volume, by installing a bleed valve 47, shown in FIG. 12C at the back side of the filtration chamber.

Referring collectively to FIGS. 12A-12D, shown are schematic drawings illustrating details of a filtration assembly 90 suitable for extraction of plasma from a whole blood sample according to a seventh embodiment of the invention. FIG. 12A is a front view of the filtration assembly 90. FIG. 12B is a first perspective view of the filtration assembly 90 shown in FIG. 12A. FIG. 12C is a cross-sectional view through the filtration assembly 90 shown in FIG. 12A along line C-C. FIG. 12D is a second perspective view of the filtration assembly 90 shown in FIG. 12A.

The filtration assembly 90 has some similarities to filtration assembly 40 illustrated in FIGS. 6A-6C, and filtration assembly 80 illustrated collectively in FIGS. 11A-11D, and accordingly, some elements common to them share common reference numerals. Some reference numerals are altered with a letter at the end, indicating that the elements are similar but some differences may exist. As alluded to when discussing embodiment 80, illustrated collectively in FIGS. 11A-11D, the filtration chamber is vented (see vent 56d in FIG. 12C) to assist in recovering some plasma from the dead space. Plasma compression chamber 64 is optionally vented at vent 56c using valve 49 shown in FIG. 12C, so that the flexible member 44 of compression chamber 64 can be depressed with plasma channel 68 closed at valve 45. Compression chamber 64 maintains negative pressure by closing valve 49 and keeping valve 45 positioned so there is no fluid communication between channel 68 and both outlet 54 and the filtration chamber. By positioning valve 45 so that channel 68 is in fluid communication with the filtration chamber and not in fluid communication with the outlet 54, and opening vent 56d (using manually operable valve 47), plasma can be drawn out of the dead space (78c and the lumens of the membrane tubes).

Referring collectively to FIGS. 13A-13C, shown are schematic drawings illustrating details of a filtration assembly 100 suitable for extraction of plasma from a whole blood sample according to an eight embodiment of the invention. FIG. 13A is a perspective view of the filtration assembly 100, with a syringe 184 attached. FIG. 13B is a front view of the filtration assembly 100 shown in FIG. 13A, with the syringe 184 attached. FIG. 13C is cross-sectional view through the filtration assembly 100 shown in FIG. 13B along line C-C, showing opening 54b absent the syringe 184.

The filtration assembly 100 is similar to filtration assembly 30 illustrated collectively in FIGS. 3A-3D, and accordingly, some elements common to them share common reference numerals. Some reference numerals are altered with a letter at the end, indicating that the elements are similar but some differences may exist. The first difference is that assembly 100 has a single plasma flow path, beginning at the plasma side of the membrane of hollow fiber bundle 76b and terminating at the outlet 54b; the plasma can be drawn directly into a syringe 184, which replaces the plasma compression chamber 64 of filtration assembly 30 (shown in FIG. 3C). The advantage of assembly 100 over the prior art is that, like assembly 30 assembly 100 can be used with a double-ended needle assembly, because of the pierceable septum 48.

Referring collectively to FIGS. 14A-14D, shown are schematic drawings illustrating details of a filtration assembly 110 suitable for extraction of plasma from a whole blood sample according to a ninth embodiment of the invention. FIG. 14A is a front view of the filtration assembly 110. FIG. 14B is a top view of the filtration assembly 110 shown in FIG. 14A. FIG. 14C is a cross-sectional view through the filtration assembly 110 shown in FIG. 14A along line C-C. FIG. 14D is a perspective view of the filtration assembly 110 shown in FIG. 14A.

The filtration assembly 110 is similar to filtration assembly 80 illustrated collectively in FIGS. 11A-11D, and accordingly, some elements common to them share common reference numerals. Some reference numerals are altered with a letter at the end, indicating that the elements are similar but some differences may exist. The first difference is that the first blood flow path and the auxiliary blood flow path 58c terminate at the same blood compression chamber 62c, but via a 3-port valve 51; the 3-port valve 43 in assembly 80 (shown in FIG. 11C) is absent in assembly 110. The second difference is that the blood compression chamber 62c has a closeable vent 56b via valve 41. The third difference is that the plasma compression chamber 64 also has a closeable vent 56c via valve 49. By positioning the 3-port valve 51 so that the blood compression chamber 62c is in fluid communication with channel 58c, and not in fluid communication with the channel 58 (i.e., simultaneously open to channel 58c and closed to channel 58), the blood can make a second pass through the filtration chamber. Because blood compression chamber 62c and plasma compression chamber 64 are optionally vented, their flexible members can be depressed and released any number of times, to modulate the pressure in compression chambers. A person of ordinary skill in the art will appreciate that movement of blood in the filtration chamber in both directions can be improved by installing closeable vents close to valve 51, in channel 58 or in both channels 58 and 58c. In operation, the vent in channel 58 only needs to be open when valve 51 positioned for fluid communication between compression chamber 62c and channel 58c only; if there is a vent in channel 58c, it only needs to be open when valve 51 is positioned for fluid communication between compression chamber 62c and channel 58 only.

Referring to FIG. 14C, a person of ordinary skill in the art will appreciate that channel 58c is equivalent to a dead-end channel when valve 51 is positioned to cease fluid communication between channel 58c and both channel 58 and compression chamber 62c. A function of a dead-end channel is to trap air, and by compression and decompression of the trapped air, facilitate filtration by allowing the retentate to flow through the filtration chamber more than once. Use of a dead-end channel is explained more in the description of assembly 120. The prior art (U.S. Pat. Nos. 7,816,124 and 7,807,450) does not disclose dead-end channels for trapping air, and compressing and decompressing the trapped air.

Referring collectively to FIGS. 15A-15E, shown are schematic drawings illustrating details of a filtration assembly 120 suitable for extraction of plasma from a whole blood sample according to a tenth embodiment of the invention. FIG. 15A is a front view of a filtration assembly 120, with a syringe 184b attached. FIG. 15B is a cross-sectional view through the filtration assembly 120 shown in FIG. 15A along line B-B. FIG. 15C is a perspective view of the filtration assembly 120 shown in FIG. 15A, showing inlet opening 22c absent the syringe 184b. FIG. 15D is a cross-sectional view through the filtration assembly 120 and the syringe 184b shown in FIG. 15B along line D-D. FIG. 15E is an enlarged perspective view of a pivotal or pivotal frictionally engaged plunger 44b of the compression chamber 64 shown in FIG. 15D. A longitudinal axis of the plunger 44b makes reference to an axis that runs through the center of the plunger 44b, orthogonal to the sectional view shown in FIG. 15B (or parallel to the front view shown in FIG. 15A). A person of ordinary skill in the art will appreciate that pivotal motion of the plunger 44b about the longitudinal axis is translated into up and down motion of the plunger 44b in the plasma compression chamber 64. Plunger 44b is described as a pivotal frictionally engaged plunger.

As already explained, a person of ordinary skill in the art would recognize that assembly 120 and the previous assemblies illustrated are also suitable for other functions, for example, which should not be considered limiting in any way, the extraction of a plasma or serum ultra-filtrate, and the collection of a plasma or serum concentrate from plasma and serum respectively.

The filtration assembly 120 is similar to filtration assemblies already illustrated, and accordingly, some elements common to them share common reference numerals. Some reference numerals are altered with a letter at the end, indicating that the elements are similar but some differences may exist. Some significant differences in assembly 120 are: 1) the manually operable plasma compression chamber 64 comprises a pivotal frictionally engaged plunger 44b for modulating pressure in the chamber 64, instead of the flexible member 44 illustrated in FIGS. 14A, B and D, for example; 2) the inlet opening 22c for introducing the sample comprises a Luer fitting for accepting a syringe 184b containing the blood; 3) the blood flow path terminates at a dead-end of a tube-like structure 58, instead of a blood compression chamber illustrated as 62 in FIG. 12C. The advantage of a dead-end channel 58 over the prior art is to trap and compress air when blood is injected into assembly 120, using syringe 184b; after the syringe plunger is released, the compressed air in the dead-end channel 58 becomes decompressed, reversing the blood flow and pushing the syringe plunger out. This process can be repeated any number of times, depending on the liquid sample. A person of ordinary skill in the art will appreciate that if the sample is blood, the red blood cells will burst if the blood is allowed to pass through the filtration chamber too many times. However, if the sample is, for example, plasma (the filtrate being an ultra-filtrate of plasma), the plasma can pass through the filtration chamber more times than a blood sample since plasma does not contain cells that can rupture.

Referring to FIGS. 15A and 15C, the wall 64x of the plasma compression chamber 64 is illustrated. Threads along the inside of the wall 64x are illustrated in FIG. 15D. Also illustrated in FIGS. 15A and 15C-15E is a finger holder 108 in plunger 44b that provides a means for manually rotating the plunger 44b about its longitudinal axis. In this particular embodiment, as an example, maximum movement of the plunger 44b inside the compression chamber 64 can be achieved by rotating the plunger 44b between 1 and 2 full turns, based on the pitch of the thread displayed. However, the pitch of the thread displayed is not meant to limit the size of the thread pitch in any way. The prior art (U.S. Pat. Nos. 7,816,124 and 7,807,450) does not disclose the use of compression chambers with frictionally engaged plungers.

Referring to FIG. 15E, shown is an enlarged perspective view of a pivotal frictionally engaged plunger 44b of the compression chamber 64 shown in FIG. 15D. Shown also is an O-ring 34a used to create a seal between the compression chamber wall 64x and the plunger 44b, whereby the plunger 44b is frictionally engaged with the compression chamber 64.

A person of ordinary skill in the art will appreciate that beside an O-ring, other circular structures for creating a seal between the compression chamber wall 64x and the plunger 44b, can be used. Some features of assembly 120 offers the following advantages over a flexible member described in some embodiments as well as the prior art (U.S. Pat. Nos. 7,816,124 and 7,807,450): 1) modulation of pressure inside the compression chamber does not depend on the rebound property of the flexible member; 2) positive and negative pressures are generated in the compression chamber 64 by rotating the plunger 44b clockwise and counter-clockwise about its longitudinal axis; 3) easier to control plunger movement, for providing fine pressure modulation, and the pitch of the thread in the plunger 44b determines how much turning is required to generate a certain amount of positive or negative pressure in the compression chamber 64; 4) hands-off system where fingers do not have to remain in contact with the top of the pivotal plunger 44b, in order to prevent activation of negative pressure, as is the case with a depressed flexible member; 5) the threads precisely determines the maximum travel of the plunger 44b in the compression chamber 64, in both the in and out direction; 6) the vent 56c (via valve 49) allows the plunger 44b to eject and inject air from and into the plasma compression chamber 64 respectively, in order to modulate the pressure inside the compression chamber 64, after blood is drawn into the assembly 120.

A person of ordinary skill in the art will appreciate that assembly 120 provides multiple passes of the blood through the filtration chamber, with the combined use of the syringe and the dead-end channel 58 by simply pushing and releasing the syringe plunger. The volume of the torturous structure 58 is sufficient to trap air which, when compressed by pushing down on the syringe plunger, can become decompressed after the syringe plunger is released, so as to push back the syringe plunger. Compression and decompression of the air trapped in the dead-end channel can be performed repeatedly to facilitate filtration of a liquid sample across a porous membrane.

Referring collectively to FIGS. 16A-16E, shown are schematic drawings illustrating details of a filtration assembly 130 suitable for extraction of plasma from a whole blood sample according to an eleventh embodiment of the invention. FIG. 16A is a front view of the filtration assembly 130. FIG. 16B is a first cross-sectional view through the filtration assembly 130 shown in FIG. 16A along line B-B. FIG. 16C is a top view of the filtration assembly 130 shown in FIG. 16A. FIG. 16D is a second cross-sectional view through the filtration assembly 130 shown in FIG. 16C along line D-D. FIG. 16E is a third cross-sectional view through the filtration assembly 130 shown in FIG. 16C along line E-E.

The filtration assembly 130 is similar to filtration assembly 80 illustrated collectively in FIGS. 11A-11D, and accordingly, some elements common to them share common reference numerals. Some reference numerals are altered with a letter at the end, indicating that the elements are similar but some differences may exist. Some significant differences in assembly 130 are: 1) the manually operable blood compression chamber 62 comprises a spring-assisted frictionally engaged plunger 42c for modulating the pressure in the blood compression chamber 62 (instead of a flexible member 42 illustrated in FIGS. 11A, 11B and 11D), fitted with O-rings 34b and 34c to provide a seal between the wall 62x of the blood compression chamber 62 and the plunger 42c; 2) blood compression chamber 62 comprises annular stops 104a and 106a for limiting movement of the plunger 42c; 3) a spring 92a for pushing the plunger 42c against annular stop 104a; 4) the manually operable plasma compression chamber 64 comprises a spring-assisted frictionally engaged plunger 44c for modulating the pressure in the chamber 64 (instead of a flexible member 44 illustrated in FIGS. 11A, 11B and 11D), fitted with O-rings 34d and 34e to provide a seal between the wall 64x of the plasma compression chamber and the plunger 44c; 5) chamber 64 comprises annular stops 104b and 106b for limiting movement of the plunger 44c; 5) a check valve 55 is disposed between the inlet opening 22a and the filtration chamber, to prevent back flow of blood into a patient's blood vessel; 6) a spring 92b for pushing the plunger 44c against annular stops 104b; 7) an auxiliary dead-end channel 58d; and 8) a valve 53 at the intersection of channel 58d and the first blood flow path, wherein the auxiliary dead end channel 58d replaces the blood compression chamber 62b (as well as the valve 41 and vent 56b) illustrated in FIG. 11C.

The function of the dead-end channel 58d is to trap sufficient air, which can be compressed and decompressed by opening valve 53, after blood is drawn into the housing 32 of assembly 130, and pressing and releasing plunger 42c. When plunger 42c is pushed down, the blood is pushed across the filtration chamber and compresses the air in the dead-end channel 58d. Subsequently, when plunger 42c is released, the compressed air in the dead-end channel 58d becomes decompressed, and pushes the blood across the filtration chamber in the opposite direction. A person of ordinary skill in the art will appreciate that the spring 92a is essential to create negative pressure in the blood compression chamber 62 for drawing blood through the inlet opening 22a (with valve 53 closed), but the spring is not essential for compression and decompression of the trapped air in the dead-end channel 58d (with valve 53 open). The plungers 42c and 44c are examples of a second type of frictionally engaged plungers that are used to operate compression chambers of the present invention, and are not intended to limit the scope of frictionally engaged plungers used with compression chambers of the present invention. The other frictionally engaged plunger disclosed is the pivotal plunger 44b shown in FIGS. 15E and 15D.

Assembly 130 also has some similarities with assembly 120, illustrated collectively in FIGS. 15A-15D, with respect to the plasma compression chamber 64. Referring to FIG. 16D, shown are two O-rings 34b and 34c used to create a seal between the compression chamber wall 62x and the plunger 42c. Also shown is a spring 92a used to facilitate rebound of the plunger 42c, after it is pushed downward and then released. A person of ordinary skill in the art will appreciate that for certain embodiments, the plunger 42c can function without the spring 92a, depending on the manner in which the assembly 130 is used. Similarly (referring to FIG. 16E), shown are two O-rings 34d and 34e used to create a seal between the compression chamber wall 64x and the plunger 44c. Also shown is a spring 92b used to facilitate rebound of the plunger 44c, after it is pushed downward and then released. A person of ordinary skill in the art will appreciate that for certain embodiments, the plunger 44c can function without the spring 92b, depending on the manner in which the assembly 130 is used.

Referring to FIGS. 16B and 16D is shown a cavity 96, for facilitating fluid communication between the blood compression chamber 62 and channel 58. Similarly, referring to FIG. 16B and FIG. 16E is shown a cavity 98, for facilitating fluid communication between the plasma compression chamber 64 and channel 68.

Some features of assembly 130 offers the following advantages over a flexible member described in some embodiments as well as the prior art (U.S. Pat. Nos. 7,816,124 and 7,807,450), for modulating the pressure inside a compression chamber: 1) the rebound of the plunger depends on the spring tension; 2) the annular stops 104a and 106a precisely determine the maximum travel of plunger 42c in the blood compression chamber 62, in both in and out directions (similar features are shown for the plasma compression chamber 64); 3) the vent 56b allows the plunger 42c to eject and inject air from and into the blood compression chamber 62 respectively, in order to modulate the pressure inside the compression chamber 62, after blood is drawn into the assembly 130.

A person of ordinary skill in the art will appreciate that if blood is injected into assembly 130 through the septum 48, a spring 92a shown in FIG. 16D is not essential. In operation, plunger 42c shown in FIG. 16D must be in a depressed position before the blood is injected into assembly 130, and the injection force will push the plunger 42c out.

Referring collectively to FIGS. 17A-17E, shown are schematic drawings illustrating details of a filtration assembly 140 suitable for extraction of plasma from a whole blood sample according to a twelfth embodiment of the invention. FIG. 17A is a front view of a filtration assembly 140. FIG. 17B is a first cross-sectional view through the filtration assembly 140 shown in FIG. 17A along line B-B. FIG. 17C is a second cross-sectional view through the filtration assembly 140 shown in FIG. 17B along line C-C. FIG. 17D is a perspective view of the filtration assembly 140 shown in FIG. 17A. FIG. 17E is the perspective view of the filtration assembly 140 shown in FIG. 17D, with all the parts hidden except the plunger 42c (with O-rings 34b and 34c), plunger 44c (with O-rings 34d and 34e), and the springs 92a and 92b.

As already explained, a person of ordinary skill in the art would appreciate that assembly 140 and the previous assemblies illustrated are also suitable for other functions, for example, which should not be considered limiting in any way, the extraction of plasma (or serum) ultra-filtrate and the collection of a plasma (or serum) concentrate from plasma (or serum).

The filtration assembly 140 is similar to filtration assembly 130 illustrated in FIGS. 16A-16E, and accordingly, some elements common to them share common reference numerals. Some reference numerals are altered with a letter at the end, indicating that the elements are similar but some differences may exist. Some significant differences in assembly 140 are: 1) an inlet opening 22d, designed to accommodate a first open end of a piece of flexible or rigid tubing having the first open end and a second open end, the tubing commonly referred to as a sipper, whereby sample can be drawn into the assembly 140 after the second open end of the sipper is inserted into a sample; 2) an auxiliary blood flow channel 58e for creating a second blood flow path; 3) a manually operable multi-directional valve 61, disposed at the intersection of the first flow path and the auxiliary flow path (no check valve included); 4) a manually operable multi-directional valve 59, disposed at the intersection of the direction of plasma flow through the outlet 54 (from the filtration chamber) and the blood flow path in the auxiliary blood flow channel 58e; and 5) a manually operable multi-directional valve 57, disposed at the intersection of the plasma reservoir 68 and a channel for vent 56c. A person of ordinary skill in the art will appreciate that auxiliary channel 58e is a dead-end channel when valve 59 is positioned so that there is no fluid communication between auxiliary channel 58e and both outlet 54 and the filtration chamber of assembly 140.

It should be noted that valve 61 of assembly 140 (see FIG. 17D) is shown as a Type-T valve but, analogous valve 53 of assembly 130 (see FIG. 16C) is shown as a "straight" valve. Valve 61 is a Type-T valve because there is no check valve disposed between the inlet opening 22d and the filtration chamber of assembly 140 (see FIG. 17B), whereas there is a check valve 55 disposed between the inlet opening 22a and the filtration chamber of assembly 130 shown in FIG. 16B.

Operation of assembly 140 comprises the following:

a) Manually turning valve 59 to simultaneously cut off fluid communication between plasma reservoir 78f and outlet 54, and between plasma reservoir 78f and auxiliary channel 58e, whereby auxiliary channel 58e becomes an dead-end channel like dead-end channel 58d in assembly 130 shown in FIG. 16B;

b) Manually turning valve 61 to cut off fluid communication between auxiliary channel 58e and the first blood flow path (also referred to as retentate flow path, which begins at inlet opening 22d and ends at blood/retentate compression chamber 62);

c) Inserting first open end of sipper into inlet opening 22d;

d) Inserting second open end of sipper into blood supply after step c);

e) Displacing air out of blood compression chamber 62 (also referred to as a retentate compression chamber) at any time, by depressing plunger 42c with vent 56b open (for an embodiment with no vent 56b, this step has to precede step c) because inlet 22d can function as vent 56b as long as the first flow path is unoccupied with sample);

f) Manually turning valve 51 to cut off fluid communication between blood compression chamber 62 and channel 58, and between blood compression chamber 62 and vent 56b, following step e);

g) Displacing air out of plasma compression chamber 64 (also referred to as a filtrate compression chamber) at any time, by depressing plunger 44c with vent 56c open (for an embodiment with no vent 56c, this step has to precede step a) because outlet 54 can function as vent 56c);

h) Manually turning valve 57 to cut off fluid communication between plasma compression chamber 64 and plasma flow channel 68, and between plasma compression chamber 64 and vent 56c, following step g);

i) Manually turning valve 61 to simultaneously make fluid communication between sipper open end and filtration chamber (there is no fluid communication between auxiliary channel 58e and first blood flow path due to the position of valve 61);

j) Manually turning valve 51 to make fluid communication between blood compression chamber 62 and filtration chamber, following step i);

k) Manually turning valve 57 to make fluid communication between plasma compression chamber 64 and filtration chamber, following step j), l) Manually turning valve 61 to simultaneously cut off fluid communication between sipper open end and filtration chamber and fluidly connect auxiliary channel 58e and the first blood flow path, after sufficient blood enters housing 32;

m) Repeatedly depressing and releasing plunger 42c of the blood compression chamber 62 until sufficient plasma enters the plasma flow channel 68.

After step m), either the plasma can be ejected through outlet 54 by turning valve 59 to make fluid communication between the outlet 54 and the plasma reservoir 78f only, or concentrated blood can be ejected through outlet 54 by turning valve 59 to make fluid communication between the outlet 54 and the auxiliary channel 58e only. A person of ordinary skill in the art will appreciate that although assembly 140 uses the same outlet 54 for plasma and concentrated blood, facilitated by the multi-directional valve 59, other embodiments of the invention comprise independent outlets for plasma and concentrated blood, wherein the use of a multi-directional valve 59 becomes optional.

The steps described before for preparing retentate of filtrate from a primary sample are numerous, and one of ordinary skill in the art will appreciate that the procedures can be simplified by strategically designing embodiments of the invention with certain non-essential elements absent.

The inventor has described various types of compression chambers for manually modulating pressure in a retentate or a filtrate compression chamber, wherein the compression chambers are distinguished by one of the following combination of activities and elements: 1) Depression and releasing of a flexible member attached to a compression chamber; 2) Rotating a frictionally engaged plunger having threads on its circumferential sides about a longitudinal axis, in a compression chamber having mating threads, whereby the rotational motion is translated into plunger movement along the longitudinal axis; 3) Depression and release of a frictionally engaged spring-loaded plunger in a compression chamber; and 4) Depression of a frictionally engaged plunger in a compression chamber, absent any spring (i.e., the plunger is not spring-loaded). A person of ordinary skill in the art will appreciate that an embodiment of the present invention can comprise any combination of elements described above for modulating pressure in a compression chamber.

Although not shown in any of the embodiments, it will be understood that some embodiments of the filtration assembly comprise signal providing means for measuring at least one analyte in any of the fluid chambers, as described by the inventor in U.S. Pat. Nos. 7,816,124 and 7,807,450. Some non-limiting examples of measurement techniques include at least an optical chamber having at least one optical window for performing spectroscopic measurement, or a biosensor chamber comprising at least one biosensor in contact with the fluid containing the analyte being measured.

An essential feature of the apparatus is a flow-through filtration chamber comprising a porous membrane, sometimes simply referred to as a membrane or a filter. The membrane has optional shapes and sizes, and includes a wall with a wall thickness, and pores through the wall of the membrane. Filtration is enhanced by the following: a) increased sample flow along the sample side of the membrane; b) increased size and number of pores in the membrane; c) decreased membrane wall thickness; d) increased surface area of the membrane; and e) applying negative pressure to the filtrate side of the membrane, i.e., the trans-membrane pressure. A person of ordinary skill in the art will appreciate that the general function of the present invention is to prepare a filtrate or concentrate of any liquid, which may or may not comprise cellular or particulate matter. Therefore, although the embodiments of the invention described uses blood as the primary sample, the invention is not limited in any way to processing blood. As explained before, blood was used because the prior art (U.S. Pat. Nos. 7,816,124 and 7,807,450) was specifically described for processing blood, and blood facilitates description of the invention because the filtrate is plasma, and the parts of the embodiments can be described with reference to one or more blood flow path, and one or more plasma flow path. Increased blood flow decreases the apparent viscosity of the blood, but if the flow is too forceful, hemolysis could occur. Also, if the pores are too large, the formed elements of blood (e.g., red blood cells) could filter through with the plasma. Furthermore, the formed elements of blood could plug up the pores, hindering filtration, and hemolysis could occur as the red blood cells squeeze through the pores. As mentioned before, where plasma or serum is used as the primary sample, the term filtrate, although described more appropriately as a plasma ultra-filtrate and a serum ultra-filtrate respectively, is still used since the primary samples used to describe the present invention, are not intended to limit the scope of the invention in any way.

As explained before, a filtration chamber does not point to any isolated structure in the embodiments of the invention, but points to a general structure that comprises a porous membrane assembled in any configuration, a sample inlet to the filtration chamber, an outlet for outflow of the fraction of sample that does not penetrate the membrane (referred to as the retentate or concentrate), and an outlet for the fraction of sample that penetrates the membrane (referred to as the filtrate). A person of ordinary skill in the art will appreciate that the inlet to the filtration chamber of a filtration assembly is not necessarily the inlet opening designated by the numbers 22a, 22b, 22c and 22d. Similarly, a person of ordinary skill in the art will appreciate that the outlet of the filtration chamber of a filtration assembly is not necessarily the outlet designated by the numbers 54 and 54b. A schematic representation of a filtration chamber is provided in FIGS. 3C and 3D, and it should be noted that the inlet opening 22a and outlet 54 of this embodiment are not included in the schematic representation of the filtration chamber. The filtration membrane in this embodiment is in the form of hollow fibers, but membrane in other embodiments are flat, and the configuration of the membrane is not intended to limit the scope of the invention in any way. As explained before, the side of the membrane in contact with retentate is referred to as the retentate side, and the side of the membrane in contact with the filtrate is referred to as the filtrate side.

In some embodiments, the interior walls of the apparatus are treated with a hydrophilic coating to promote even spreading of the blood within an optical chamber, and to promote movement of blood along the flow path. A flow path may also contain one or more reagents, anywhere along the flow path, for example without limitation, an anticoagulant, a hemolyzing reagent, or a reagent that reacts with an analyte to enhance detection. In some use of the apparatus, anticoagulated blood is collected in a microtube, for example blood collected from the heel of a neonate after a pin or lancet prick, for diagnosing and treating neonatal jaundice.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention. Numerous modifications and variations of the present invention are possible in light of the above teachings. It is therefore to be understood that within the scope of the appended claims, the invention may be practiced otherwise than as specifically described herein. Furthermore, the discussed combination of features might not be absolutely necessary for the inventive solution.

The invention claimed is:

1. A filtration assembly for preparing a filtrate or a retentate from a liquid sample, the assembly comprising:
   a housing;
   an inlet in the housing for receiving the liquid sample;
   a filtration chamber comprising a membrane having a retentate side and a filtrate side;
   a retentate flow path in the housing comprising the retentate side of the membrane and a dead-end channel for trapping air, wherein the dead-end channel is fluidly connectable to a flow path between the inlet and the filtration chamber;
   a manually operable retentate compression chamber for compressing and decompressing the air in the dead-end channel to facilitate filtration of the liquid sample across the membrane, the manually operable retentate compression chamber being fluidly connectable to the dead-end channel;

a 3-port valve disposed at the intersection of the dead-end channel and the flow path between the inlet and the filtration chamber, wherein the 3-port valve is configurable to fluidly connect the dead-end channel and the manually operable retentate compression chamber; and an outlet for removing at least one of the filtrate and the retentate from the housing.

2. The filtration assembly according to claim 1, wherein the filtration assembly further comprises a manually operable valve disposed between the manually operable retentate compression chamber and a vent in the housing for venting the retentate compression chamber.

3. The filtration assembly according to claim 1, wherein the filtration assembly further comprises a manually operable filtrate compression chamber in fluid communication with the filtrate side of the membrane.

4. The filtration assembly according to claim 1, wherein the membrane in the filtration chamber is configured as at least one hollow fiber membrane.

5. The filtration assembly according to claim 1, wherein the inlet comprises a pierceable septum.

6. The filtration assembly according to claim 5, wherein the filtration assembly further comprises a check valve disposed between the septum and the filtration chamber.

7. The filtration assembly according to claim 1, wherein the manually operable retentate compression chamber comprises a frictionally engaged plunger for modulating pressure inside the manually operable retentate compression chamber.

8. A filtration assembly for preparing a filtrate or a retentate from a liquid sample, the assembly comprising:

a housing;

an inlet in the housing for receiving the liquid sample;

a filtration chamber comprising a membrane having a retentate side and a filtrate side;

a retentate flow path in the housing comprising the retentate side of the membrane, the retentate flow path comprising a dead-end channel for trapping air;

a filtrate flow path beginning at the filtrate side of the membrane and terminating at a manually operable filtrate compression chamber comprising a frictionally engaged plunger for modulating pressure inside the manually operable filtrate compression chamber;

a manually operable syringe engaged at the inlet for compressing and decompressing air in the dead-end channel to facilitate filtration of the liquid sample across the membrane; and an outlet for removing at least one of the filtrate and the retentate from the housing.

9. The filtration assembly according to claim 8 further comprising a 3-port valve disposed at the intersection of the filtrate flow path and a flow path between the outlet and the filtration chamber, wherein the 3-port valve is configurable to maintain patency of the filtrate flow path, and is also configurable to fluidly connect the filtrate compression chamber to the outlet.

10. The filtration assembly according to claim 8, wherein the frictionally engaged plunger has a central axis of rotation and comprises a threaded circumferential exterior for engaging with the manually operable filtrate compression chamber such that the frictionally engaged plunger is pivotable about the central axis to modulate the pressure in the manually operable filtrate compression chamber.

* * * * *